(12) United States Patent
Phillips et al.

(10) Patent No.: US 9,990,535 B2
(45) Date of Patent: Jun. 5, 2018

(54) PALLET DETECTION USING UNITS OF PHYSICAL LENGTH

(71) Applicant: Crown Equipment Corporation, New Bremen, OH (US)

(72) Inventors: Sian Phillips, Auckland (NZ); Shantanu Padhye, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 60 days.

(21) Appl. No.: 15/139,394

(22) Filed: Apr. 27, 2016

(65) Prior Publication Data

US 2017/0316253 A1    Nov. 2, 2017

(51) Int. Cl.
  *G06K 9/00* (2006.01)
  *G06K 9/62* (2006.01)
  *G06T 7/00* (2017.01)

(52) U.S. Cl.
  CPC ..... *G06K 9/00208* (2013.01); *G06K 9/00791* (2013.01); *G06K 9/6202* (2013.01);
  (Continued)

(58) Field of Classification Search
  CPC ........... G06K 9/00208; G06K 9/00214; G06K 9/00791; G06K 9/36; G06K 9/6202;
  (Continued)

(56) References Cited

U.S. PATENT DOCUMENTS 3,069,654 A   12/1962  Hough
3,672,470 A    6/1972  Ohntrup et al.
(Continued)

FOREIGN PATENT DOCUMENTS

CA   2144886 A1    9/1996
CN   1201754 A    12/1998
(Continued)

OTHER PUBLICATIONS

Rosales et al.; 3D Trajectory Recovery for Tracking Multiple Objects and Trajectory Guided Recognition of Actions; Proc. IEEE Conference on Computer Vision and Pattern Recognition; pp. 117-123; Jun. 1999.
(Continued)

*Primary Examiner* — Jose Couso
(74) *Attorney, Agent, or Firm* — Stevens & Showalter LLP

(57) ABSTRACT

An image of a physical environment is acquired that comprises a plurality of pixels, each pixel including a two-dimensional pixel location in the image plane and a depth value corresponding to a distance between a region of the physical environment and the image plane. For each pixel, the two dimensional pixel location and the depth value is converted into a corresponding three-dimensional point in the physical environment defined by three coordinate components, each of which has a value in physical units of measurement. A set of edge points is determined within the plurality of three-dimensional points based, at least in part, on the z coordinate component of the plurality of points and a distance map is generated comprising a matrix of cells. For each cell of the distance map, a distance value is assigned representing a distance between the cell and the closest edge point to that cell.

42 Claims, 25 Drawing Sheets

(52) U.S. Cl.
CPC .......... *G06T 7/0044* (2013.01); *G06T 7/0051* (2013.01); *G06T 2207/10028* (2013.01); *G06T 2207/30252* (2013.01)

(58) Field of Classification Search
CPC ............. G06K 9/6211; G06K 9/00234; G06K 9/3233; G06K 2009/484; G06K 2209/055; G06T 7/0044; G06T 7/0051; G06T 7/11; G06T 7/194; G06T 7/50; G06T 7/593; G06T 7/73; G06T 7/75; G06T 15/00; G06T 15/04; G06T 17/00; G06T 17/05; G06T 17/10; G06T 17/20; G06T 2200/24; G06T 2200/08; G06T 2207/10028; G06T 2207/20092; G06T 2200/04; G06T 2207/10012; B25J 5/007; B25J 9/1697; B25J 19/023; B66F 9/0755; B66F 9/063; B66F 9/24; G01B 11/002; G01B 11/14; G05B 2219/39391; G05B 2219/40513; G05B 2219/40564; G05B 2219/40604; G05B 2219/40611; G05B 2219/45049; G01S 15/8993; G01S 7/6245; G01S 17/89; Y10S 367/91; Y10S 901/09; G06F 17/50; G06F 17/5009; H04N 13/0203; H04N 13/0239; H04N 13/0271; G05D 2201/0216; G05D 1/0246; G05D 1/0274; G05D 1/021; G05D 1/0225; G06Q 10/087; G01C 11/04
See application file for complete search history.

(56) References Cited

U.S. PATENT DOCUMENTS

| | | | |
|---|---|---|---|
| 3,854,820 A | 12/1974 | Hansen | |
| 4,122,957 A | 10/1978 | Allen et al. | |
| 4,224,657 A | 9/1980 | Olson | |
| 4,279,328 A | 7/1981 | Ahlbom | |
| 4,331,417 A | 5/1982 | Shearer, Jr. | |
| 4,411,577 A | 10/1983 | Shearer, Jr. | |
| 4,490,848 A | 12/1984 | Beall et al. | |
| 4,547,844 A | 10/1985 | Adams | |
| 4,564,085 A | 1/1986 | Melocik et al. | |
| 4,678,329 A | 7/1987 | Lukowski, Jr. et al. | |
| 4,679,329 A | 7/1987 | Goldsmith et al. | |
| 4,684,247 A | 8/1987 | Hammill, III | |
| 5,208,753 A | 5/1993 | Acuff | |
| 5,300,869 A | 4/1994 | Skaar et al. | |
| 5,318,219 A | 6/1994 | Smith | |
| 5,586,620 A | 12/1996 | Dammeyer et al. | |
| 5,738,187 A | 4/1998 | Dammeyer et al. | |
| 5,749,696 A | 5/1998 | Johnson | |
| 5,812,395 A | 9/1998 | Masciangelo et al. | |
| 5,832,138 A | 11/1998 | Nakanishi et al. | |
| 5,835,623 A | 11/1998 | Nishijima et al. | |
| 5,938,710 A | 8/1999 | Lanza et al. | |
| 6,052,627 A | 4/2000 | Nakamura | |
| 6,111,983 A | 8/2000 | Fenster et al. | |
| 6,150,938 A | 11/2000 | Sower et al. | |
| 6,194,860 B1* | 2/2001 | Seelinger ................ | B25J 5/007 318/586 |
| RE37,215 E | 6/2001 | Dammeyer et al. | |
| 6,246,476 B1 | 6/2001 | Frohn et al. | |
| 6,388,748 B1 | 5/2002 | Kokura | |
| 6,411,210 B1 | 6/2002 | Sower et al. | |
| 6,713,750 B2 | 3/2004 | Goddard | |
| 6,795,187 B2 | 9/2004 | Kokura | |
| 6,902,897 B2 | 6/2005 | Tweedie et al. | |
| 6,952,488 B2 | 10/2005 | Kelly et al. | |
| 7,010,404 B2 | 3/2006 | Ichijo et al. | |
| 7,035,431 B2 | 4/2006 | Blake et al. | |
| 7,219,769 B2 | 5/2007 | Yamanouchi et al. | |
| 7,221,776 B2 | 5/2007 | Xiong | |
| 7,274,970 B2 | 9/2007 | Schuchard | |
| 7,277,187 B2 | 10/2007 | Smith et al. | |
| 7,315,631 B1 | 1/2008 | Corcoran et al. | |
| 7,320,385 B2 | 1/2008 | Katae et al. | |
| 7,379,564 B2 | 5/2008 | Kakinami et al. | |
| 7,403,643 B2 | 7/2008 | Ianculescu et al. | |
| 7,460,695 B2 | 12/2008 | Steinberg et al. | |
| 7,487,020 B2 | 2/2009 | Iwazaki et al. | |
| 7,620,218 B2 | 11/2009 | Steinberg et al. | |
| 7,648,329 B2 | 1/2010 | Chilson et al. | |
| 7,696,894 B2 | 4/2010 | Fiegert et al. | |
| 7,742,062 B2 | 6/2010 | Oisel et al. | |
| 7,765,668 B2 | 8/2010 | Townsend et al. | |
| 7,893,416 B2 | 2/2011 | Dror | |
| 7,958,624 B2 | 6/2011 | Townsend et al. | |
| 8,009,203 B2 | 8/2011 | An et al. | |
| 8,009,864 B2 | 8/2011 | Linaker et al. | |
| 8,050,461 B2 | 11/2011 | Shpunt et al. | |
| 8,055,029 B2 | 11/2011 | Petrescu et al. | |
| 8,116,550 B2 | 2/2012 | Zahniser | |
| 8,155,447 B2 | 4/2012 | Veeraraghavan et al. | |
| 8,234,047 B2 | 7/2012 | Madsen et al. | |
| 8,243,987 B2 | 8/2012 | Hampapur et al. | |
| 8,265,349 B2 | 9/2012 | Wang et al. | |
| 8,295,980 B2 | 10/2012 | Williamson | |
| 8,306,314 B2 | 11/2012 | Tuzel et al. | |
| 8,395,671 B2 | 3/2013 | Kimura | |
| 8,472,698 B2 | 6/2013 | Agrawal et al. | |
| 8,508,590 B2 | 8/2013 | Laws et al. | |
| 8,509,496 B2 | 8/2013 | Steinberg et al. | |
| 8,538,577 B2 | 9/2013 | Bell et al. | |
| 8,542,276 B2 | 9/2013 | Huang et al. | |
| 8,553,982 B2 | 10/2013 | Tong et al. | |
| 8,561,897 B2 | 10/2013 | Kunzig et al. | |
| 8,565,913 B2 | 10/2013 | Emanuel et al. | |
| 8,599,268 B2 | 12/2013 | Niinami | |
| 8,655,588 B2 | 2/2014 | Wong et al. | |
| 8,705,792 B2 | 4/2014 | James et al. | |
| 8,718,372 B2 | 5/2014 | Holeva et al. | |
| 8,744,196 B2 | 6/2014 | Sharma et al. | |
| 8,849,007 B2 | 9/2014 | Holeva et al. | |
| 8,866,901 B2 | 10/2014 | Azuma et al. | |
| 8,881,360 B2 | 11/2014 | Townsend et al. | |
| 8,885,948 B2 | 11/2014 | Holeva et al. | |
| 8,934,672 B2 | 1/2015 | Holeva et al. | |
| 8,938,126 B2 | 1/2015 | Holeva et al. | |
| 8,939,842 B2 | 1/2015 | Ehrmann | |
| 8,965,561 B2* | 2/2015 | Jacobus ................ | G06Q 10/087 700/214 |
| 8,974,169 B2 | 3/2015 | Mizner | |
| 8,977,032 B2 | 3/2015 | Holeva et al. | |
| 8,995,743 B2 | 3/2015 | Holeva et al. | |
| 9,002,062 B2 | 4/2015 | Aller | |
| 9,025,827 B2 | 5/2015 | Holeva et al. | |
| 9,025,886 B2 | 5/2015 | Holeva et al. | |
| 9,056,754 B2* | 6/2015 | Wong ................... | G05D 1/0274 |
| 9,082,195 B2 | 7/2015 | Holeva et al. | |
| 9,087,384 B2 | 7/2015 | Holeva et al. | |
| 9,090,441 B2 | 7/2015 | Mizner | |
| 9,105,080 B2 | 8/2015 | McAndrew et al. | |
| 9,111,349 B2 | 8/2015 | Szeliski et al. | |
| 9,393,691 B2 | 7/2016 | Noda et al. | |
| 9,561,941 B1 | 2/2017 | Watts | |
| 9,635,346 B2* | 4/2017 | Iida ...................... | H04N 13/0203 |
| 2002/0054210 A1 | 5/2002 | Glier et al. | |
| 2004/0086364 A1 | 5/2004 | Watanabe et al. | |
| 2006/0018524 A1 | 1/2006 | Suzuki et al. | |
| 2007/0098264 A1 | 5/2007 | Van Lier et al. | |
| 2007/0154295 A1 | 7/2007 | Kuriakose | |
| 2008/0011554 A1 | 1/2008 | Broesel et al. | |
| 2008/0284207 A1 | 11/2008 | Bollinger et al. | |
| 2010/0091094 A1 | 4/2010 | Sekowski | |
| 2011/0088979 A1 | 4/2011 | Bandringa et al. | |
| 2012/0002056 A1 | 1/2012 | Nam et al. | |
| 2012/0082385 A1 | 4/2012 | Xu et al. | |
| 2012/0095575 A1 | 4/2012 | Meinherz et al. | |
| 2012/0114181 A1* | 5/2012 | Borthwick ............ | G06T 7/593 382/104 |
| 2012/0121166 A1* | 5/2012 | Ko ....................... | G06K 9/00234 382/154 |

(56) References Cited

U.S. PATENT DOCUMENTS

| | | | |
|---|---|---|---|
| 2012/0123614 | A1 | 5/2012 | Laws et al. |
| 2012/0327190 | A1 | 12/2012 | Massanell et al. |
| 2013/0054129 | A1 | 2/2013 | Wong et al. |
| 2013/0101166 | A1 | 4/2013 | Holeva et al. |
| 2015/0377612 | A1* | 12/2015 | Suzuki ............... G01B 11/002 382/106 |
| 2016/0090283 | A1 | 3/2016 | Svensson et al. |

FOREIGN PATENT DOCUMENTS

| | | |
|---|---|---|
| CN | 1253109 A | 5/2000 |
| CN | 101174395 A | 5/2008 |
| CN | 201327383 Y | 10/2009 |
| CN | 201458666 U | 5/2010 |
| CN | 103875021 A | 6/2014 |
| CN | 103889878 A | 6/2014 |
| CN | 103889879 A | 6/2014 |
| CN | 104011772 A | 8/2014 |
| DE | 4141925 A1 | 6/1993 |
| DE | 4405770 A1 | 8/1995 |
| DE | 202012004864 U1 | 12/2012 |
| EP | 0712697 A2 | 5/1996 |
| EP | 0800129 A1 | 10/1997 |
| EP | 0884212 A1 | 12/1998 |
| EP | 1361190 A1 | 11/2003 |
| EP | 1408001 A1 | 4/2004 |
| EP | 1413404 A2 | 4/2004 |
| EP | 1502896 A1 | 2/2005 |
| EP | 1986153 A2 | 10/2008 |
| EP | 2468678 A1 | 6/2012 |
| EP | 2768758 A1 | 8/2014 |
| EP | 2768759 A1 | 8/2014 |
| EP | 2769361 A1 | 8/2014 |
| EP | 2769362 A | 8/2014 |
| FR | 2815450 A1 | 4/2002 |
| GB | 2019809 A | 11/1979 |
| GB | 2359291 A | 8/2001 |
| JP | 07257270 A | 10/1995 |
| JP | 09030324 A | 2/1997 |
| JP | 09278397 A | 10/1997 |
| JP | 2001002395 A | 1/2001 |
| JP | 2001122598 A | 5/2001 |
| JP | 2001139291 A | 5/2001 |
| JP | 2001139298 A | 5/2001 |
| JP | 2001206684 A | 7/2001 |
| JP | 2002241094 A | 8/2002 |
| JP | 2003192295 A | 7/2003 |
| JP | 2003341996 A | 12/2003 |
| JP | 2005104652 A | 12/2003 |
| JP | 3932811 B2 | 6/2007 |
| JP | 4298453 B2 | 7/2009 |
| WO | 1987002484 A1 | 4/1987 |
| WO | 2005006252 A1 | 1/2005 |
| WO | 2005108146 A1 | 11/2005 |
| WO | 2005108246 A2 | 11/2005 |
| WO | 2008057504 A1 | 5/2008 |
| WO | 2009131235 A1 | 10/2009 |
| WO | 2011108944 A2 | 9/2011 |
| WO | 2013059142 A1 | 4/2013 |
| WO | 2013059143 A1 | 4/2013 |
| WO | 2013059144 A1 | 4/2013 |
| WO | 2013059145 A1 | 4/2013 |
| WO | 2013059147 A1 | 4/2013 |
| WO | 2013059148 A1 | 4/2013 |
| WO | 2013059149 A1 | 4/2013 |
| WO | 2013059150 A1 | 4/2013 |
| WO | 2013059151 A1 | 4/2013 |
| WO | 2013059153 A1 | 4/2013 |
| WO | 2013066613 A1 | 5/2013 |
| WO | 2016167200 A1 | 10/2016 |

OTHER PUBLICATIONS

Mallon et al.; Precise Radial Un-distortion of Images; Proc. of the 17th International Conference on Pattern Recognition; ICPR 2004; pp. 18-21; 2004.

Hu, Jiuxang et al.; An Algorithm for Computing Extrinsic Camera Parameters for Accurate Stereo Photogrammetry of Clouds; Arizona State University; pp. 1-10; Technical Report; 2006.

Park, Seong-Woo et al.; Real-Time Camera Calibration for Virtual Studio; Real-Time Imaging; vol. 6; pp. 433-448; 2000.

Cuevas et al.; Kalman Filter for Vision Tracking; Technical Report B 05-12; pp. 1-18; Aug. 10, 2005.

Elias et al.; Projective Geometry for Three-Dimensional Computer Vision; Proceedings of the Seventh World Multiconference on Systemics, Cybernetics and Informatics; pp. 1-41; 2003.

Tsai, R.; A Versatile Camera Calibration Technique for High-Accuracy 3D Machine Vision Metrology Using Off-the-Shelf TV Cameras and Lenses; IEEE Journal of Robotics and Automation; vol. RA-3; No. 4; pp. 323-344; Aug. 1987.

Camera Calibration and 3D Reconstruction; Open CV2.0 C Reference; pp. 1-25; Sep. 2009.

Cucchiara et al.; Focus Based Feature Extraction for Pallets Recognition; BMVC2000; pp. 1-10; www.bmva.org/bmvc/2000/papers/p70; Jan. 1, 2000.

Baxansky et al.; Single-Image Motion Deblurring Using a Low-Dimensional Hand Shake Blur Model; 2010 IEEE 26th Convention of Electrical and Electronics Engineers in Israel; pp. 97-100; Nov. 17, 2010.

Seelinger et al.; Automatic Visual Guidance of a Forklift Engaging a Pallet; Robotics and Autonomous Systems; vol. 54, No. 12; ScienceDirect; pp. 1026-1038; Dec. 31, 2006; Elsevier Science Publisher.

Pages et al.; A Computer Vision System for Autonomous Forklift Vehicles in Industrial Environments; Proc. of the 9th Mediterranean Conference on Control and Automation MEDS 2001; pp. 1-6; Jan. 1, 2001.

Katsoulas, D.K.; An Efficient Depalletizing System Based on 2D Range Imagery; Proceedings of the 2001 IEEE International Conference on Robotics and Automation; ICRA 2001; Seoul, Korea; pp. 305-312; May 21-26, 2001.

Gish et al.; Hardware Antialiasing of Lines and Polygons; Proceedings of the 1992 Symposium on Interactive 3D Graphics; pp. 75-86; Jan. 1, 1992.

Cats Eye—Forklift Camera and Monitor; www.safetyinfo.com/equipment/forklifts/catseye.htm; 1 page; Believed to have been published prior to Sep. 14, 2009.

Oralco Products; http://www.gcaon.ca/orlaco_products.htm; Believed to have been published prior to Sep. 14, 2009.

Lift truck Camera Systems; http://www.liftek.com/liftek_170.htm; Believed to have been published prior to Sep. 14, 2009.

Lyvers et al.; Subpixel Measurements Using a Moment-Based Edge Operator; IEEE Transactions on Pattern Analysis and Machine Intelligence; vol. 11, No. 12; pp. 1293-1309; Dec. 1989.

Line Detection: Application of the Hough; Application of the Hough Transform to Line Detection; Chapter 9; pp. 264-271; Believed to have been published prior to Sep. 20, 2011.

Cox, Earl; The Fuzzy Systems Handbook: A Practitioner's Guide to Building, Using, and Maintaining Fuzzy Systems; Chapter 4; Fuzzy Operators; pp. 109-121; 1994.

Abbaraju et al.; Iris Recognition Using Corner Detection; Proceedings of the International Conference on Applied Computer Science; 5 pages; Sep. 15-17, 2010.

The Segmentation Problem; pp. 85-117; Believed to have been published before Oct. 16, 2012.

Seelinger et al.; Automatic Pallet Engagement by a Vision Guided Forklift; Robotics and Automation; 2005; ICRA 2005; Proceedings of the 2005 IEEE International Conference; IEEE; 2005; 6 pages.

Walter et al.; Closed-loop Pallet Manipulation in Unstructured Environments; The 2010 IEEE/RSJ International Conference on Intelligent Robots and Systems; IEEE 2010; Oct. 18-22, 2010; pp. 5119-5126.

Accu-Fork Laser; Fork/Tine Position Laser; US-Laser, Inc.; Research/Design/Production; 2 pages; Published on or before May 29, 2009.

(56) References Cited

OTHER PUBLICATIONS

Raymond fork tip laser ensure accuracy for reach-fork trucks; Source: IVT magazine; http://www.ivtinternational.com/new.php?NewsID=11777; 1 page; Apr. 2009.
Material Transport (AMTS); (AMTS); Material Transport (AMTS) Application; http://www.rec.ri.cmu.edu/projects/amts/application/index.php; 2013.
Chen et al.; Recognition of Box-like Objects by Fusing Cues of Shape and Edges; The University of Texas at Austin, Department of Electrical and Computer Engineering: 2008.
Baglivo et al.; Autonomous Pallet Localization and Picking for Industrial Forklifts. A Robust Range and Look Method; Measurement Science and Technology; vol. 22, No. 8; Jul. 7, 2011.
Wienand; Robot Vision for Depalletizing of Mixed Pallet Loads Power Point Presentation; ISRA Vision Systems AG; Darmstadt, Germany; www.isravision.com, 2003.
Castaneda et al.; Time-of-Flight and Kinect Imaging Presentation; Kinect Programming for Computer Vision; Computer Aided Medical Procedures; Technische Universitat Munchen; Jun. 1, 2011.
Canny Edge Detector; Retrieved from https://en.wikipedia.org/wiki/Canny_edge_detector on May 4, 2017.
Canny Edge Dectector; Retrieved from doc.opencv.org/2.4/doc/tutorials/imgproc/imgtrans/Cany_detector/canny_detector.html on May 4, 2017.
Erosion (morphology); Retrieved from https://en.wikipedia.org/wiki/Erosion_(morphology) on Jun. 30, 2017.
Eroding and Dilating; Retrieved from docs.opencv.org/2.4/doc/tutorials/imgproc/erosion_dilatation/erosion_dilatation.html on May 4, 2017.
Chen et al.; Refinement to the Chamfer matching for a "center-on" fit; Image and Vision Computing Conference New Zealand; Palmerston North, NZ; Nov. 2003.
Distance transform; Retrieved from https://en.wikipedia.org/wiki/Distance_transform on May 4, 2017.
Simulated Annealing; Retrieved from https://en.wikipedia.org/wiki/Simulated_annealing on May 4, 2017.
Ankur Datta; Chamfer Matching and Hausdorff Distance Presentation; Carnegie Mellon University; published Mar. 29, 2017; downloaded from http://www.cs.cmu.edu/~efors/courses/LBMV07/presentations/0301Comparison.ppt.
Pick-and-Drop System(PDS)—Love Park Robotics; retrieved from http://www.loveparkrobotics.com/pds on Jun. 19, 2017.
Point Cloud Library; retrieved from https://en.wikipedia.org/wiki/Point_Cloud_Library on Jun. 19, 2017.
Linda Tessens; International Search Report and Written Opinion; International Application No. PCT/US2017/026493 (CRN 727 PB); Jun. 19, 2017; European Patent Office; Rijswijk, Netherlands.

\* cited by examiner

FIG. 11B

|   | 1 | 2 | 3 | 4 | 5 | 6 | 7 | 8 | 9 | 10 |
|---|---|---|---|---|---|---|---|---|---|---|
| 1 | $d_3$ | $d_2$ | $d_2$ | $d_1$ | $d_1$ | $d_1$ | $d_3$ | $d_4$ | $d_6$ | $d_7$ |
| 2 | $d_1$ | $d_1$ | $d_1$ | $d_1$ | ○ | $d_1$ | $d_2$ | $d_3$ | $d_4$ | $d_5$ |
| 3 | $d_1$ | ○ | ○ | ○ | ○ | $d_1$ | $d_2$ | $d_3$ | $d_4$ | $d_5$ |
| 4 | $d_1$ | $d_1$ | $d_1$ | $d_1$ | ○ | $d_1$ | $d_2$ | $d_3$ | $d_3$ | $d_3$ |
| 5 | $d_2$ | $d_2$ | $d_2$ | $d_1$ | ○ | $d_1$ | $d_2$ | $d_2$ | $d_2$ | $d_2$ |
| 6 | $d_1$ | $d_1$ | $d_1$ | $d_1$ | $d_1$ | $d_1$ | $d_1$ | $d_1$ | $d_1$ | $d_1$ |
| 7 | ○ | $d_1$ | ○ | $d_1$ | ○ | ○ | ○ | ○ | ○ | ○ |
| 8 | $d_1$ | $d_1$ | $d_1$ | $d_1$ | $d_1$ | $d_1$ | $d_1$ | $d_1$ | $d_1$ | $d_1$ |
| 9 | $d_2$ | $d_3$ | $d_2$ | $d_1$ | ○ | $d_1$ | $d_2$ | $d_2$ | $d_2$ | $d_2$ |

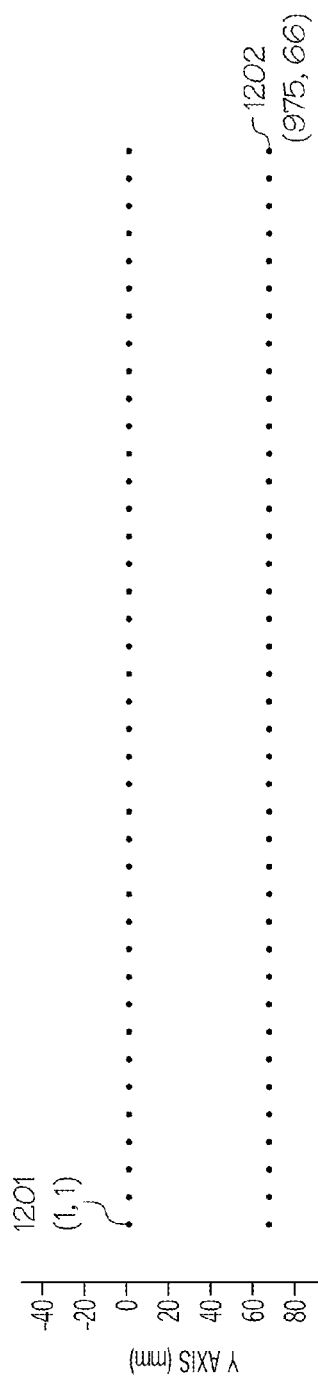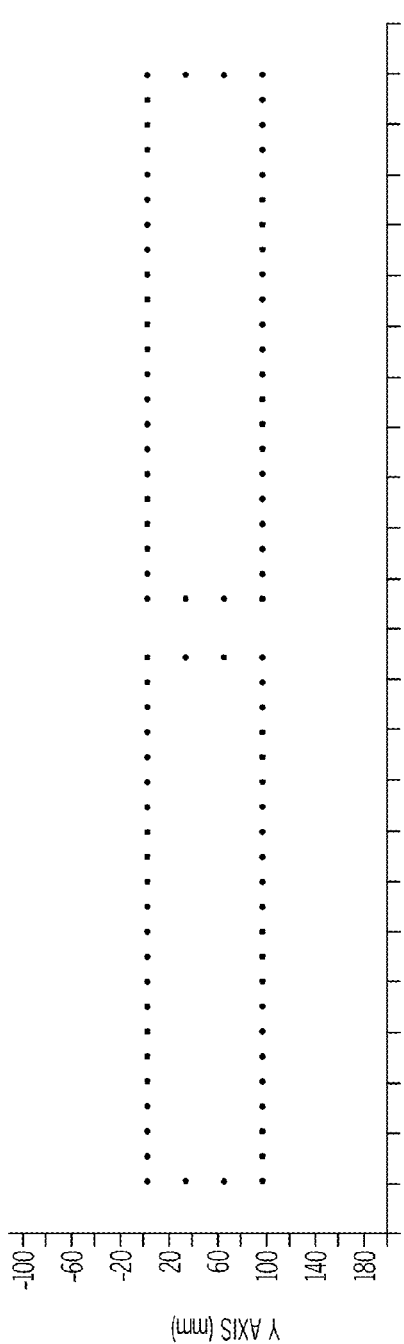
FIG. 12A
FIG. 12B

|   | 1 | 2 | 3 | 4 | 5 | 6 | 7 | 8 | 9 | 10 |
|---|---|---|---|---|---|---|---|---|---|---|
| 1 | $d_3$ | $d_2$ | $d_2$ | $d_1$ | $d_1$ | $d_1$ | $d_3$ | $d_4$ | $d_6$ | $d_7$ |
| 2 | $d_1$ | $d_1$ | $d_1$ | $d_1$ | ◯ | $d_1$ | $d_2$ | $d_3$ | $d_4$ | $d_5$ |
| 3 | $d_1$ | ◯ | ◯ | ◯ | ◯ | $d_1$ | $d_2$ | $d_3$ | $d_4$ | $d_5$ |
| 4 | $d_1$ | $d_1$ | $d_1$ | $d_1$ | ◯ | $d_1$ | $d_2$ | $d_3$ | $d_3$ | $d_3$ |
| 5 | $d_2$ | $d_2$ | $d_2$ | $d_1$ | ◯ | $d_1$ | $d_2$ | $d_2$ | $d_2$ | $d_2$ |
| 6 | $d_1$ | $d_1$ | $d_1$ | $d_1$ | $d_1$ | $d_1$ | $d_1$ | $d_1$ | $d_1$ | $d_1$ |
| 7 | ◯ | $d_1$ | ◯ | $d_1$ | ◯ | ◯ | ◯ | ◯ | ◯ | ◯ |
| 8 | $d_1$ | $d_1$ | $d_1$ | $d_1$ | $d_1$ | $d_1$ | $d_1$ | $d_1$ | $d_1$ | $d_1$ |
| 9 | $d_2$ | $d_3$ | $d_2$ | $d_1$ | ◯ | $d_1$ | $d_2$ | $d_2$ | $d_2$ | $d_2$ |

FIG. 13B

|   | 1 | 2 | 3 | 4 | 5 | 6 | 7 | 8 | 9 | 10 |
|---|---|---|---|---|---|---|---|---|---|---|
| 1 | $d_3$ | $d_2$ | $d_2$ | $d_1$ | $d_1$ | $d_1$ | $d_3$ | $d_4$ | $d_6$ | $d_7$ |
| 2 | $d_1$ | $d_1$ | $d_1$ | $d_1$ | ○ | $d_1$ | $d_2$ | $d_3$ | $d_4$ | $d_5$ |
| 3 | $d_1$ | ○ | ○ | ○ | ○ | $d_1$ | $d_2$ | $d_3$ | $d_4$ | $d_5$ |
| 4 | $d_1$ | $d_1$ | $d_1$ | $d_1$ | ○ | $d_1$ | $d_2$ | $d_3$ | $d_3$ | $d_3$ |
| 5 | $d_2$ | $d_2$ | $d_2$ | $d_1$ | ○ | $d_1$ | $d_2$ | $d_2$ | $d_2$ | $d_2$ |
| 6 | $d_1$ | $d_1$ | $d_1$ | $d_1$ | $d_1$ | $d_1$ | $d_1$ | $d_1$ | $d_1$ | $d_1$ |
| 7 | ○ | $d_1$ | ○ | $d_1$ | ○ | ○ | ○ | ○ | ○ | ○ |
| 8 | $d_1$ | $d_1$ | $d_1$ | $d_1$ | $d_1$ | $d_1$ | $d_1$ | $d_1$ | $d_1$ | $d_1$ |
| 9 | $d_2$ | $d_3$ | $d_2$ | $d_1$ | ○ | $d_1$ | $d_2$ | $d_2$ | $d_2$ | $d_2$ |

FIG. 13D

PALLET DETECTION USING UNITS OF PHYSICAL LENGTH

FIELD OF THE INVENTION

The present invention relates generally to materials handling vehicles, and more particularly to a system for imaging and locating a pallet to be picked by the vehicle.

BACKGROUND OF THE INVENTION

In a typical warehouse or distribution center, palletized stock items are stored in racks or other storage structures that are aligned to each side of generally long, parallel extending aisles. To maximize available space, it is common for several storage structures to be vertically stacked, such that stock may be stored at elevated heights. Accordingly, an operator of a materials handling vehicle that is retrieving and/or putting away stock may be required to look upward from an operating position of the vehicle to identify the proper height and lateral position of the forks for stock to be retrieved or put away.

Positioning a forklift carriage to pick up or to put away palletized materials becomes increasingly more difficult at increasing heights. Visual perspective becomes more difficult. Extensive training can be required in order to effectively perform the positioning adjustments necessary. Even with sufficient ability, correct positioning can take more time than desired for efficient use of the materials handling vehicle and operator. Also, in storage or warehousing facilities or other material handling environments that utilize fully autonomous vehicles to pick or place items, the layout and positioning of racks and pallets tends to be rigidly controlled so that a vertical spacing and/or horizontal spacing between various rack structure and various pallets are uniform throughout the area serviced by the autonomous vehicle. It would be beneficial to be able to use non-uniform rack sizes and spacing in areas serviced by fully autonomous vehicles.

SUMMARY

One aspect of the present invention relates to a method of analyzing an image. The image of a physical environment is acquired that comprises a plurality of pixels, each pixel including a two-dimensional pixel location in the image plane and a depth value corresponding to a distance between a region of the physical environment and the image plane. For each pixel, the two dimensional pixel location and the depth value is converted into a corresponding three-dimensional point in the physical environment defined by three coordinate components, each of which has a value in physical units of measurement. A set of edge points is determined within the plurality of three-dimensional points based, at least in part, on the z coordinate component of the plurality of points and a distance map is generated comprising a matrix of cells. For each cell of the distance map, a distance value is assigned representing a distance between the cell and the closest edge point to that cell.

In accordance with this aspect of the invention, the computer when determining the set of edge points can for each of the three-dimensional points: a) compare the z coordinate component of the three-dimensional point with the respective z coordinate component of each three-dimensional point in a predefined neighborhood of the three-dimensional points, to determine an associated edge value; and b) determine the three-dimensional point is in the set of edge points when its associated edge value is above a predetermined threshold. Also, the respective distance value of each cell in the distance map is in the same physical units of measurement as the three coordinate components (x, y, z) of the points, wherein the physical units of measurement is one of centimeters or millimeters.

In accordance with one aspect of the present invention, the computer can locate a first template at a first plurality of different locations on the distance map, wherein at each of the first plurality of different locations, the first template is aligned with a first plurality of cells (wherein the first template comprises data that identifies the associated first plurality of cells) and has an origin associated with one of the cells; and at each of the first plurality of different locations, calculate a first corresponding cost function value for the associated one cell. In particular, the first template can be one of a rack template and a pallet template, wherein the first template comprises a plurality of template points, each template point is defined by two coordinate components (m, n), each of which has a value in physical units of measurement. Also, for each template point of the first template, its corresponding coordinate component values m, n are each in the same physical units of measurement as the three coordinate components (x, y, z) of the three-dimensional points corresponding to the pixels of the image.

In accordance with another aspect of the present invention, each first corresponding cost function value can be calculated based on a distance between each of the first plurality of cells and their respective closest one edge point. As an example, the first corresponding cost function can be calculated by: a) multiplying each of the respective distance values from the first plurality of cells with themselves to generate a plurality of squared values; and b) determining a square root of a mean of the plurality of squared values.

Furthermore, the computer can identify each cell of the distance map having a first corresponding cost function value below a first predetermined threshold.

Accordingly, the computer can also locate a second template at a second plurality of different locations on the distance map, wherein at each of the second plurality of different locations, the second template is aligned with a second plurality of cells and has an origin associated with one of the cells; and at each of the second plurality of different locations, calculate a second corresponding cost function value for the associated one cell. Then, the computer can identify each cell of the distance map having: a) a first corresponding cost function value below the first predetermined threshold, and b) a second corresponding cost function value below a second predetermined threshold. As mentioned above, the first template can be a rack template and the second template can be a pallet template.

In particular, the matrix of cells of the distance map can comprise i columns of cells and j rows of cells defining (i×j) cells, with each column referenced by a first index value, a, between 1 and i; each row referenced by a second index value, b, between 1 and j; and each cell referenced by an index pair (a, b); wherein, for each cell of the distance map, its corresponding index pair values a, b are each in the same physical units of measurement as the three coordinate components (x, y, z) of the three-dimensional points corresponding to the pixels of the image. Furthermore, the closest one edge point to the cell of the distance map can be determined based on the respective (x, y) coordinate components of each of the edge points and the (a,b) index pair of that cell and the distance between the closest one edge point and the cell of the distance map can be related to a Euclidian distance between the (x,y) coordinate components of the closest one edge point and the (a,b) index pair of that cell.

Furthermore, the computer can: a) identify a maximum value of the x coordinate component from among all the edge points; and b) identify a maximum value of the y coordinate component from among all the edge points; wherein i=the maximum value of the x coordinate component; and j=the maximum value of the y coordinate component.

One aspect of the present invention relates to a system for analyzing an image, the system including a memory device storing executable instruction and a processor in communication with the memory device. The processor, when executing the executable instructions, a) acquires an image of a physical environment, wherein the image comprises a plurality of pixels, each pixel including a two-dimensional pixel location in a plane of the image and a depth value corresponding to a distance between a region of the physical environment and the plane of the image; b) for each pixel, converts the two dimensional pixel location and the depth value into a corresponding three-dimensional point in the physical environment, wherein each respective three-dimensional point corresponding to a pixel is defined by three coordinate components (x, y, z), each of which has a value in physical units of measurement; c) determines a set of edge points within the plurality of three-dimensional points based, at least in part, on the z coordinate component of one or more of the plurality of points; d) generates a distance map, wherein the distance map comprises a matrix of cells; e) identifies for each cell of the distance map, a closest one of the edge points; and f) assigns to each cell of the distance map, a respective distance value representing a distance between the cell and the closest one edge point to that cell.

In accordance with this aspect of the invention, the processor when determining the set of edge points can for each of the three-dimensional points: a) compare the z coordinate component of the three-dimensional point with the respective z coordinate component of each three-dimensional point in a predefined neighborhood of the three-dimensional points, to determine an associated edge value; and b) determine the three-dimensional point is in the set of edge points when its associated edge value is above a predetermined threshold. Also, the respective distance value of each cell in the distance map is in the same physical units of measurement as the three coordinate components (x, y, z) of the points, wherein the physical units of measurement is one of centimeters or millimeters.

In accordance with one aspect of the present invention, the processor can locate a first template at a first plurality of different locations on the distance map, wherein at each of the first plurality of different locations, the first template is aligned with a first plurality of cells (wherein the first template comprises data that identifies the associated first plurality of cells) and has an origin associated with one of the cells; and at each of the first plurality of different locations, calculate a first corresponding cost function value for the associated one cell. In particular, the first template can be one of a rack template and a pallet template, wherein the first template comprises a plurality of template points, each template point is defined by two coordinate components (m, n), each of which has a value in physical units of measurement. Also, for each template point of the first template, its corresponding coordinate component values m, n are each in the same physical units of measurement as the three coordinate components (x, y, z) of the three-dimensional points corresponding to the pixels of the image.

In accordance with another aspect of the present invention, each first corresponding cost function value can be calculated based on a distance between each of the first plurality of cells and their respective closest one edge point. As an example, the first corresponding cost function can be calculated by: a) multiplying each of the respective distance values from the first plurality of cells with themselves to generate a plurality of squared values; and b) determining a square root of a mean of the plurality of squared values.

Furthermore, the processor when executing the executable instructions can identify each cell of the distance map having a first corresponding cost function value below a first predetermined threshold.

Accordingly, the processor can also locate a second template at a second plurality of different locations on the distance map, wherein at each of the second plurality of different locations, the second template is aligned with a second plurality of cells and has an origin associated with one of the cells; and at each of the second plurality of different locations, calculate a second corresponding cost function value for the associated one cell. Then, the processor can identify each cell of the distance map having: a) a first corresponding cost function value below the first predetermined threshold, and b) a second corresponding cost function value below a second predetermined threshold. As mentioned above, the first template can be a rack template and the second template can be a pallet template.

In particular, the matrix of cells of the distance map can comprise i columns of cells and j rows of cells defining (i×j) cells, with each column referenced by a first index value, a, between 1 and i; each row referenced by a second index value, b, between 1 and j; and each cell referenced by an index pair (a, b); wherein, for each cell of the distance map, its corresponding index pair values a, b are each in the same physical units of measurement as the three coordinate components (x, y, z) of the of the three-dimensional points corresponding to the pixels of the image. Furthermore, the closest one edge point to the cell of the distance map can be determined based on the respective (x, y) coordinate components of each of the edge points and the (a,b) index pair of that cell and the distance between the closest one edge point and the cell of the distance map can be related to a Euclidian distance between the (x,y) coordinate components of the closest one edge point and the (a,b) index pair of that cell.

Furthermore, the processor when executing the executable instructions can: a) identify a maximum value of the x coordinate component from among all the edge points; and b) identify a maximum value of the y coordinate component from among all the edge points; wherein i=the maximum value of the x coordinate component; and j=the maximum value of the y coordinate component.

BRIEF DESCRIPTION OF THE DRAWINGS

FIG. 11A-FIG. 11D are a series of illustrations of a distance map created in accordance with the flowchart of FIG. 10.

FIG. 12A is an example rack template in accordance with the principles of the present invention.

FIG. 12B is an example pallet template in accordance with the principles of the present invention.

FIG. 13A-FIG. 13D provide a series of illustrations depicting how a template can be moved over a plurality of different positions of a distance map in accordance with the principles of the present invention.

DETAILED DESCRIPTION OF THE INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1A:
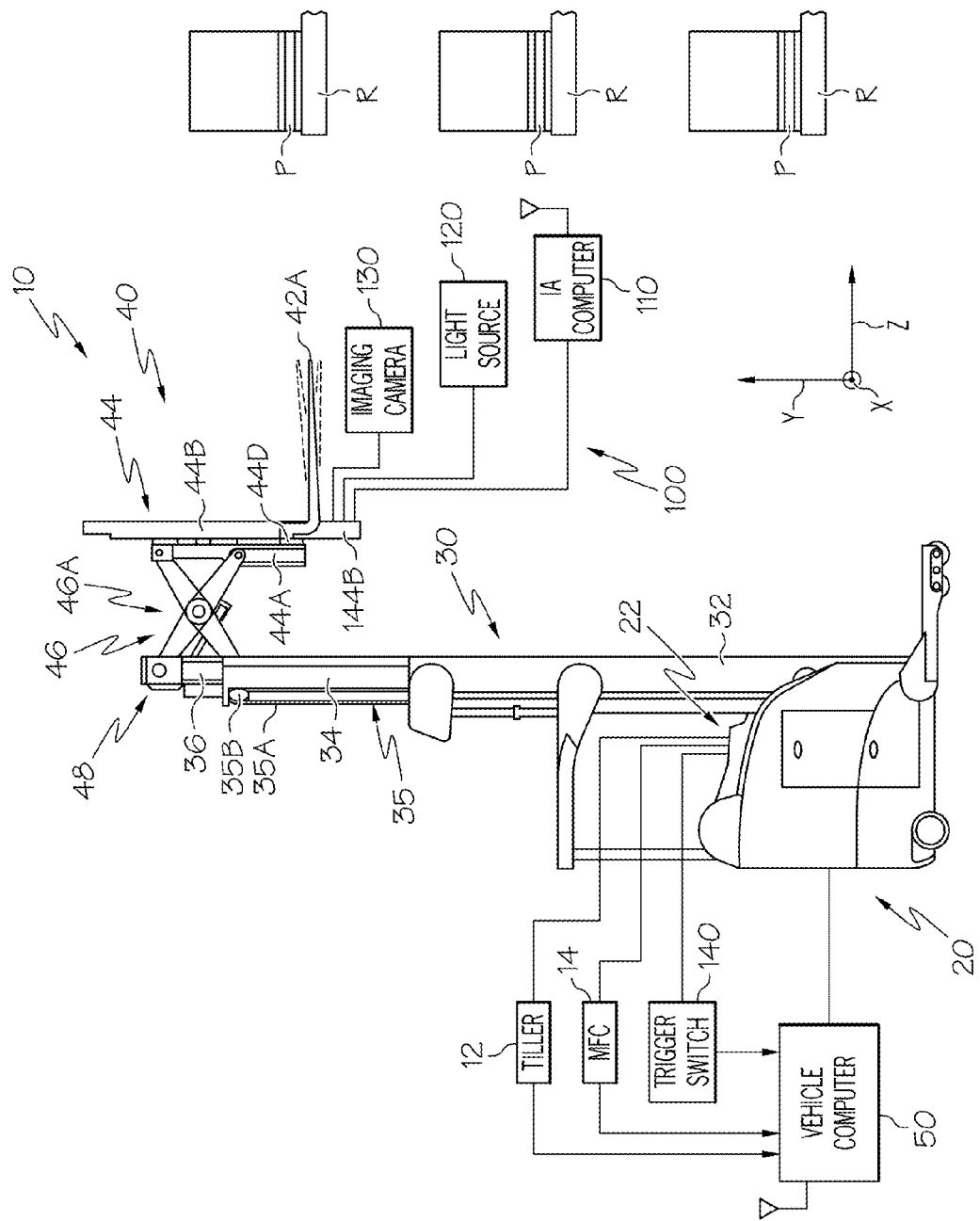
FIG. 1A and FIG. 1B illustrate a fork lift truck or vehicle in which the present invention may be incorporated.

Reference is now made to FIG. 1A, which illustrates a fork lift truck or vehicle 10 in which the present invention may be incorporated. The vehicle 10 comprises a power unit or main body 20 including an operator's compartment 22. The vehicle 10 further comprises a mast assembly 30 and a fork carriage apparatus 40, shown best in FIG. 1B. While the present invention is described herein with reference to a stand-up counterbalanced truck, it will be apparent to those skilled in the art that the invention and variations of the invention can be more generally applied to a variety of other materials handling vehicles including a rider reach fork lift truck including a monomast, as described in U.S. Patent Application Publication No. 2010/0065377, the entire disclosure of which is incorporated herein by reference. The different types of vehicle 10 in which embodiments of the present invention may be incorporated include manual vehicles, semi-autonomous vehicles, and autonomous vehicles. As identified earlier, one benefit of employing embodiments of the present invention on autonomous vehicles is that it would allow these vehicles to perform operations on racks and/or pallets that are not necessarily uniformly configured in a work area.

The mast assembly 30 includes first, second and third mast weldments 32, 34 and 36, wherein the second weldment 34 is nested within the first weldment 32 and the third weldment 36 is nested within the second weldment 34. The first weldment 32 is fixedly coupled to the truck main body 20. The second or intermediate weldment 34 is capable of vertical movement relative to the first weldment 32. The third or inner weldment 36 is capable of vertical movement relative to the first and second weldments 32 and 34.

First and second lift ram/cylinder assemblies 35 (only the first assembly is illustrated in FIG. 1A) are coupled to the first and second weldments 32 and 34 for effecting movement of the second weldment 34 relative to the first weldment 32. Chains 35A (only the chain of the first assembly is illustrated in FIG. 1A) are fixed to cylinders of the first and second lift assemblies and the third weldment 36 and extend over pulleys 35B (only the pulley of the first assembly is illustrated in FIG. 1A) coupled to a corresponding one of the rams such that movement of rams of the first and second lift assemblies effects movement of the third weldment 36 relative to the first and second weldments 32 and 34.

The fork carriage apparatus 40 is coupled to the third stage weldment 36 so as to move vertically relative to the third stage weldment 36. The fork carriage apparatus 40 also moves vertically with the third stage weldment 36 relative to the first and second stage weldments 32 and 34.

Figure 1B:
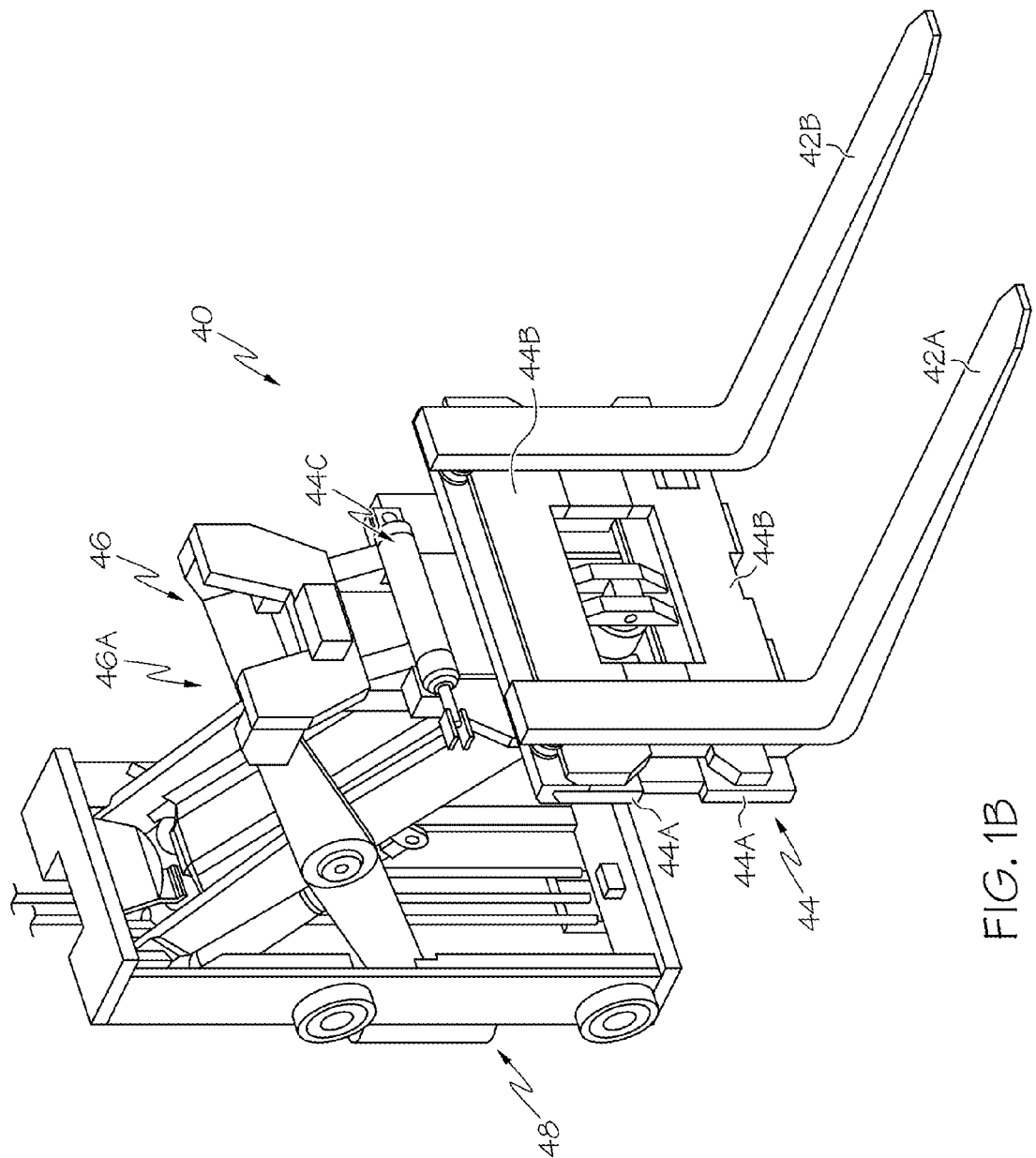

In the illustrated embodiment, the fork carriage apparatus 40 comprises a fork carriage mechanism 44 to which the first and second forks 42A and 42B are mounted, see FIGS. 1A and 1B. The fork carriage mechanism 44 is mounted to a reach mechanism 46 which, in turn, is mounted to a mast carriage assembly 48. The mast carriage assembly 48 is movably coupled to the third weldment 36. The reach mechanism 46 comprises a pantograph or scissors structure 46A, which effects movement of the fork carriage mechanism 44 and the first and second forks 42A and 42B toward and away from the mast carriage assembly 48 and the third weldment 36.

The fork carriage mechanism 44 comprises a carriage support structure 44A and a fork carriage frame 44B. The forks 42A and 42B are mounted to the fork carriage frame 44B. The frame 44B is coupled to the carriage support structure 44A for lateral and pivotable movement relative to the support structure 44A. A side-shift piston/cylinder unit 44C is mounted to the carriage support structure 44A and the fork carriage frame 44B, so as to effect lateral movement of the fork carriage frame 44B relative to the carriage support structure 44A.

A tilt piston/cylinder unit 44D, shown only in FIG. 1A, is fixedly attached to the carriage support structure 44A and contacts the fork carriage frame 44B for effecting pivotable movement of the fork carriage frame 44B relative to the carriage support structure 44A.

An operator standing in the compartment 22 may control the direction of travel of the truck 10 via a tiller 12. The operator may also control the travel speed of the truck 10, fork carriage apparatus and mast assembly extension, and tilt and side shift of the first and second forks 42A and 42B via a multifunction controller 14.

In accordance with the present invention, an image-based pallet and/or rack detection system 100 is provided for capturing one or more depth images of a physical world scene as the fork carriage apparatus 40 is raised and lowered, identifying one or more objects in the image frames which may comprise one or more pallets and/or racks, determining their locations relative to the fork carriage apparatus 40 and generating and transmitting pallet and/or rack location information to a vehicle computer 50 located on the vehicle power unit 20.

The system 100 comprises an image analysis computer 110 coupled to the fork carriage frame 44B, an optional light or illumination source 120 coupled to a lower section 144B of the fork carriage frame 44B, a 3D imaging camera 130, such as a time-of-flight camera, coupled to the lower section 144B of the fork carriage frame 44B and a trigger switch 140 located in the operator's compartment 22 to actuate the system 100. While some mounting positions may be more preferable than others, the imaging camera 130 may be located either above or below the forks. It is desirable that the camera side shift with the forks, but it does not necessarily need to tilt with the forks. However the camera and optional lights are mounted, the forks should be in the bottom of the field of view to give maximum warning of an approaching pallet. In the illustrated embodiment, the imaging camera 130 is below the forks, see FIG. 1A. The computer 110 may be located anywhere on the truck. It is also possible that items 110, 120, and 130 may be combined into a single package, comprising a smart camera. The image analysis computer 110 may either with a wired cable or wirelessly transmit pallet identification and location information to the vehicle computer 50 such that the vehicle computer 50 may accurately position the forks 42A and 42B in vertical and lateral directions, as defined by a Y-axis and X-axis, respectfully, see FIG. 1A.

The vehicle and image analysis computers 50 and 110 may comprise any kind of a device which receives input data, processes that data through computer instructions, and generates output data. Such a computer can be a hand-held device, laptop or notebook computer, desktop computer, microcomputer, digital signal processor (DSP), mainframe, server, cell phone, personal digital assistant, other programmable computer devices, or any combination thereof. Such computers can also be implemented using programmable logic devices such as field programmable gate arrays (FPGAs) or, alternatively, realized as application specific integrated circuits (ASICs) or similar devices. The term "computer" is also intended to encompass a combination of two or more of the above recited devices, e.g., two or more microcomputers. The vehicle and image analysis computers 50 and 110 may be connected wirelessly or hard-wired to one another. It is also contemplated that the computers 50 and 110 may be combined as a single computer. Accordingly, aspects of the present invention may be implemented entirely as hardware, entirely as software (including firmware, resident software, micro-code, etc.) or in a combined software and hardware implementation that may all generally be referred to herein as a "circuit," "module," "component," or "system." Furthermore, aspects of the present invention may take the form of a computer program product embodied in one or more computer readable media having computer readable program code embodied thereon.

When an operator wishes to pick a pallet P, the operator maneuvers the vehicle 10 such that it is positioned directly in front of and generally laterally aligned in the X-direction with a desired pallet P on a rack R to be picked, see FIG. 1A. The operator then raises the forks 42A and 42B vertically in the Y-direction via actuation of the multifunction controller 14 to a position above the last pallet P which is to be ignored. The image analysis computer 110 causes the imaging camera 130 to take image frames, such as at a rate of 10-30 fps (frames/second), as the fork carriage apparatus 40 continues to move vertically. As will be discussed in greater detail below, the image analysis computer 110 analyzes the images, identifies one or more objects in the image frames, determines which of the one or more objects most likely comprises a pallet and/or a rack, determines the location of the objects relative to a world coordinate origin and generates and transmits pallet location information to the vehicle computer 50. The image analysis computer 110 may also wirelessly transmit to the vehicle computer 50 pallet location information so that the vehicle computer 50 may accurately position the forks 42A and 42B in vertical and lateral directions such that the forks 42A and 42B are positioned directly in front of openings in the pallet. Thereafter, an operator need only cause the fork carriage apparatus to move toward the pallet such that the forks enter the pallet openings. Alternatively, all or some of the operations just described could be performed autonomously by the vehicle under the control of the vehicle computer 50 and the image analysis computer 110.

Figure 5:
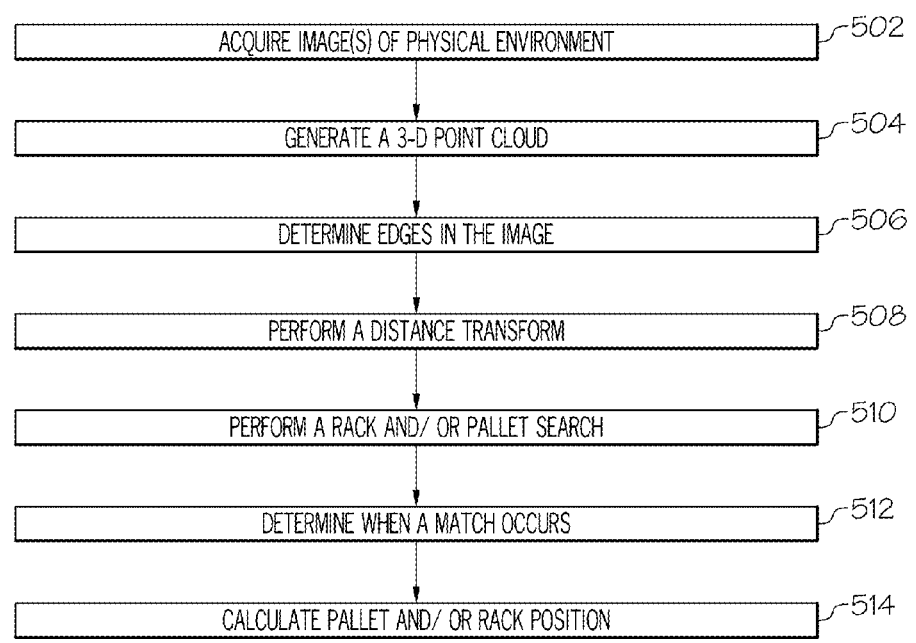
FIG. 5 is a flowchart of an example algorithm for utilizing image analysis of a 3D image to locate a rack and/or pallet in a physical environment in accordance with the principles of the present invention.

FIG. 5 is a flowchart of an example algorithm for estimating a location of a rack and/or pallet by analyzing an image of a physical environment where that pallet and rack are located. The illustrated algorithm could be performed, for example, by the image analysis computer 110. As an initial step, in step 502, one or more images of the physical environment are captured. As described above, the imaging camera 130 can be located on the vehicle 10 such that it can capture, or acquire, an image of the physical environment in front of the vehicle 10. Although a single image could be analyzed to determine a position of a pallet or rack, more than one image can be used as well. For example, if the camera 130 were capturing images at 30 fps, then a plurality of these frames could be averaged together, or otherwise statistically combined, to generate a composite image that is used for the analysis. In particular, as more fully described below, the image used for the analysis can be from a 3D camera and be comprised of a plurality of pixels with each pixel including a two-dimensional pixel location in a plane of the image and a depth value corresponding to a distance between a region of the physical environment and the plane of the image.

In step 504, the pixels are converted into a 3D point cloud. For each pixel, the two-dimensional pixel location and the depth value are converted into a corresponding 3D point in the physical environment, wherein the 3D point is defined by three coordinate components ($X_C$, $Y_C$, $Z_C$). The 3D coordinate components can be calculated in reference to an origin located, for example, at the center of the face of the camera 130. Furthermore, each of these 3D coordinate components has a value which is in physical units of measurement such as millimeters, centimeters, inches, etc.

The collection of 3D points can be considered a 3D point cloud which is analyzed, in step 506, to determine the location of any edges in the 3D image. As more fully described below, the 3D points can be logically arranged in a way that mimics how their corresponding pixels were arranged in the image plane of the 3D image. An "edge" is considered to be when there is a discontinuity between the respective $Z_C$ coordinate components of two 3D points corresponding to adjacent pixels from the image. In particular, the points in the 3D point cloud that are located at an edge are identified as "edge points". A distance map can then be created, as explained more fully below, that allows a distance transform to be performed in step 508. The distance map is comprised of a matrix of cells and the distance transform calculates a distance value for each cell that represents the distance between that cell and the closest one edge point to that cell, wherein the distance between an edge point and its closest edge point is "0". Also, as explained more fully below, the different cell locations of the distance map correspond to different distances from an origin point of the distance map. These different distances from the origin point can, for example, be measured in the same physical units of measurement as those of the coordinate components ($X_C$, $Y_C$, $Z_C$) of the points of the 3D point cloud.

A model, or template, of a rack and/or a template of a pallet can be overlaid, in step 510, on various locations of the distance map as a way to search for whether or not a pallet or rack is present in the image scene of the physical environment. The template can include a number of template points such that when overlaid on the distance map, each template point overlays one of the cells of the distance map. A score can then be calculated based on the distance values of those overlaid cells to determine, in step 512, if a match occurs at the present location of the template. The rack template is different than the pallet template; thus, the searching in step 510 and the match determination in step 512 can be performed separately for the rack template and for the pallet template. Because a pallet typically sits on a rack structure, the search for locating a possible rack can be performed first and the search for locating a possible pallet can be limited to portions of the distance map that are located within a certain distance above a possible rack. For the pallet template and the rack template, there can possibly be more than one of the template's locations on the distance map that generates a score that indicates a match of a pallet and/or rack has occurred. Accordingly, a highest score or other factors can be considered to reduce the number of locations on the distance map that are identified as matching a rack and/or a pallet.

In step 514, a position of the pallet and/or the rack is calculated. First, the location of the template that resulted in the match is determined which identifies which cells of the distance map are overlaid by the template at that location. As mentioned above, each cell location is associated with a different distance from an origin point of the distance map and, therefore, the overlaid cells can be used to determine a location of the pallet and/or rack relative to the origin point of the distance map which can, in turn, be used to determine the location of the pallet and/or rack relative to the camera.

Figure 6:
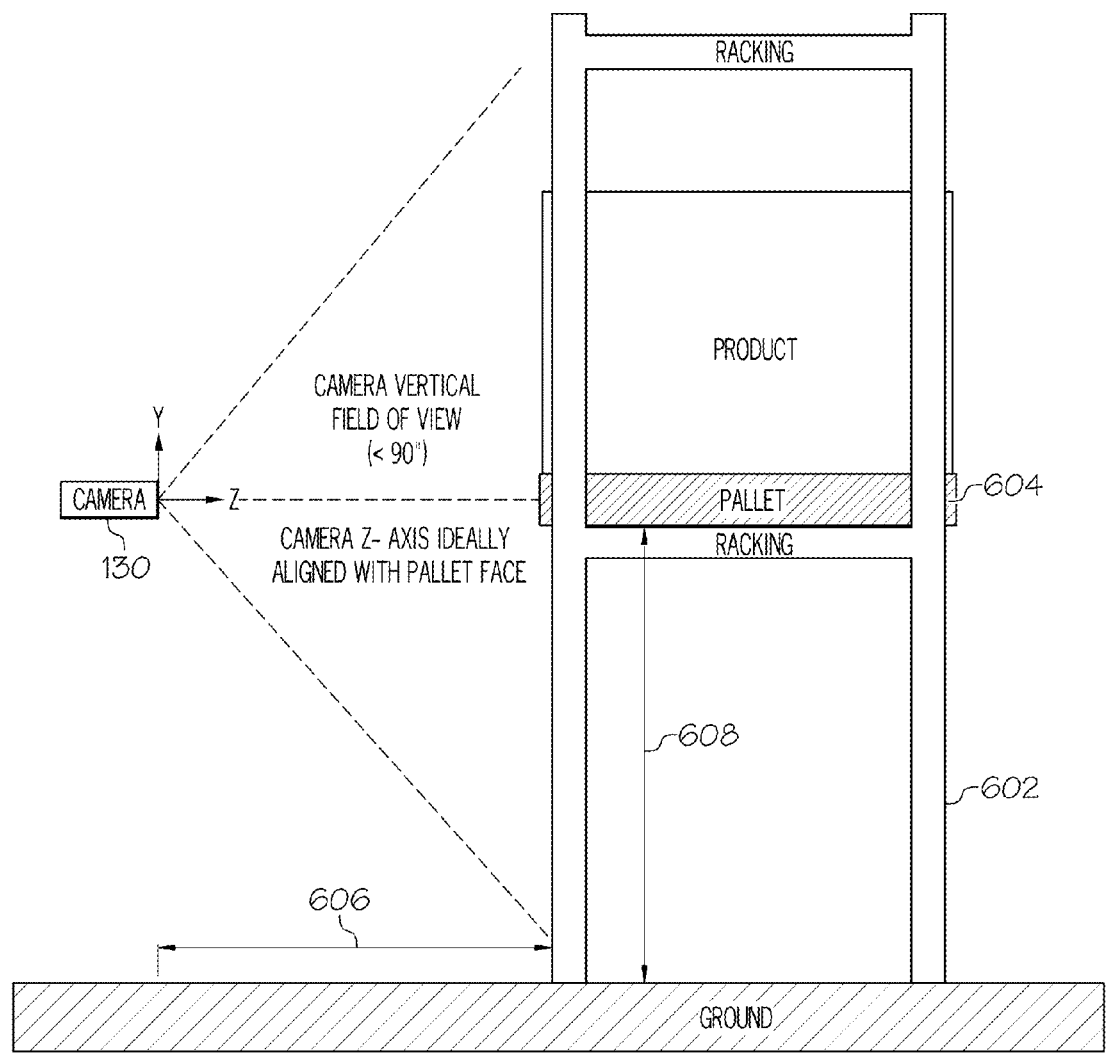
FIG. 6 depicts features of a physical environment in which the algorithm of FIG. 5 can be used in accordance with the principles of the present invention.

FIG. 6 illustrates an example environment in which the algorithm of FIG. 5 can be performed in which there is a single pallet 604. The imaging camera 130 is shown without the structure of the vehicle 10 to obscure it. However, as the vehicle 10 moves within the physical environment and its forks and carriage are raised, the camera 130 can reach a position at which it is a distance 606 from a pallet 604 and a rack 602 and also at a height 608. When the camera 130 is in the position shown in FIG. 6, embodiments of the present invention will determine a location of the pallet 604 and/or the rack 602 such that the forks of the vehicle 10 can be inserted into openings within the pallet 604 either automatically or under the control of an operator of the vehicle 10.

As mentioned, the imaging camera 130 can be a time-of-flight camera for example, such that an image produced by the camera 130 is considered to be a depth image of a scene in the physical world wherein the image is comprised of a plurality of pixel locations with each pixel location having an associated corresponding depth value. Much like a traditional image capturing device, a time-of-flight camera can have an image that comprises a plurality of pixel locations arranged in a matrix on an image plane such that each pixel location corresponds to a region in the scene in the physical world that is projected back through the camera onto the image plane. A time-of-flight camera, however, measures a distance, or depth, value for each of the pixel locations. One of ordinary skill will understand that there are other functionally equivalent techniques for generating, or acquiring, a depth image having a similar data structure without departing from the scope of the present invention.

As explained in more detail below, each pixel location is transformed into a 3D point that corresponds to a location in the physical world as measured from a set of world coordinates. By choosing a current camera location as the origin point for the world coordinates, some of the calculations for transforming the image data into 3D points are simplified. This transformation is based on the 2-D pixel location (or pixel coordinates) on an image plane along with the depth information associated with that pixel location.

Figure 2A:
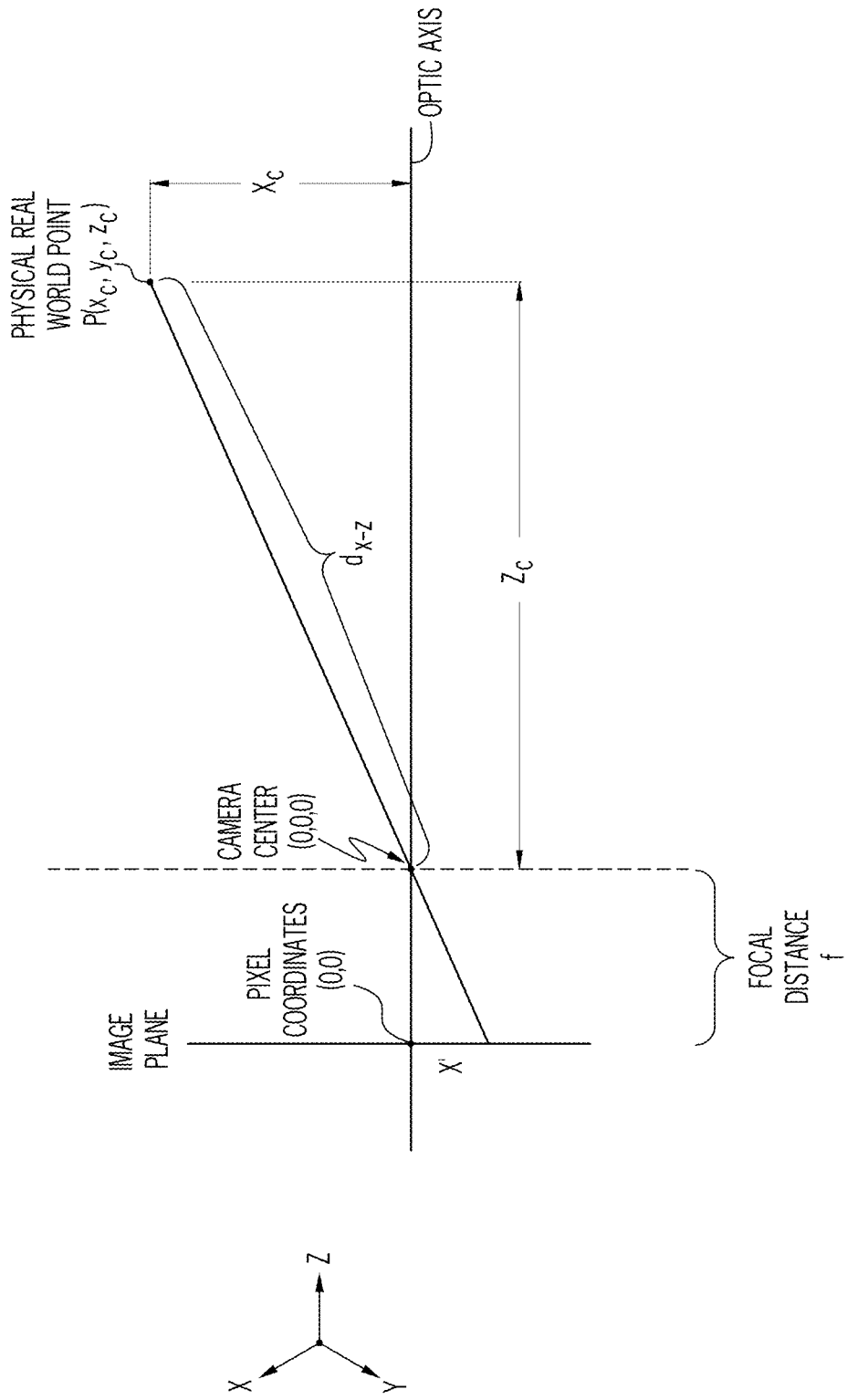
FIGS. 2A-2C illustrate a perspective projection model of a pinhole camera in accordance with the principles of the present invention.
Figure 2B:
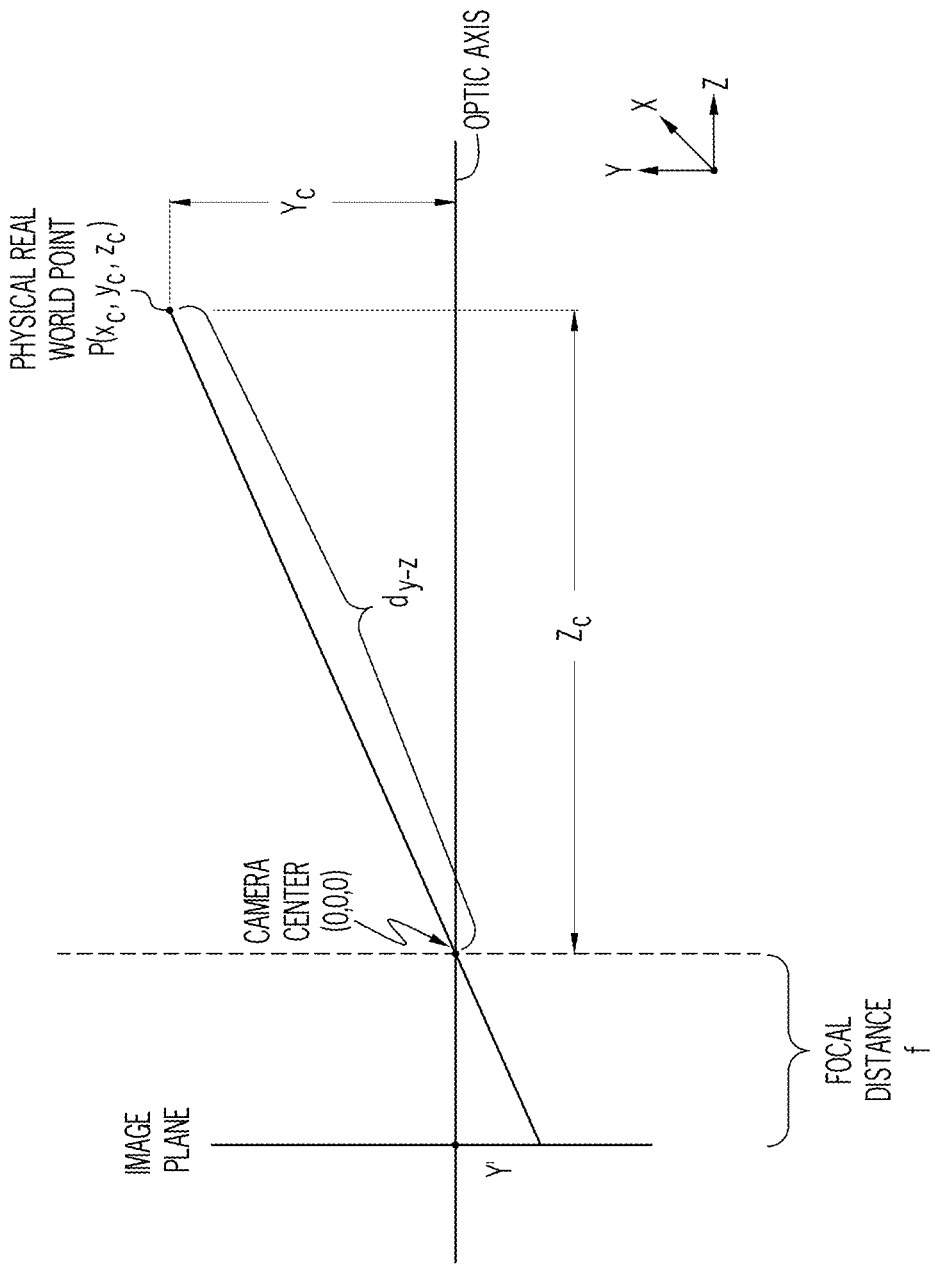
Figure 2C:
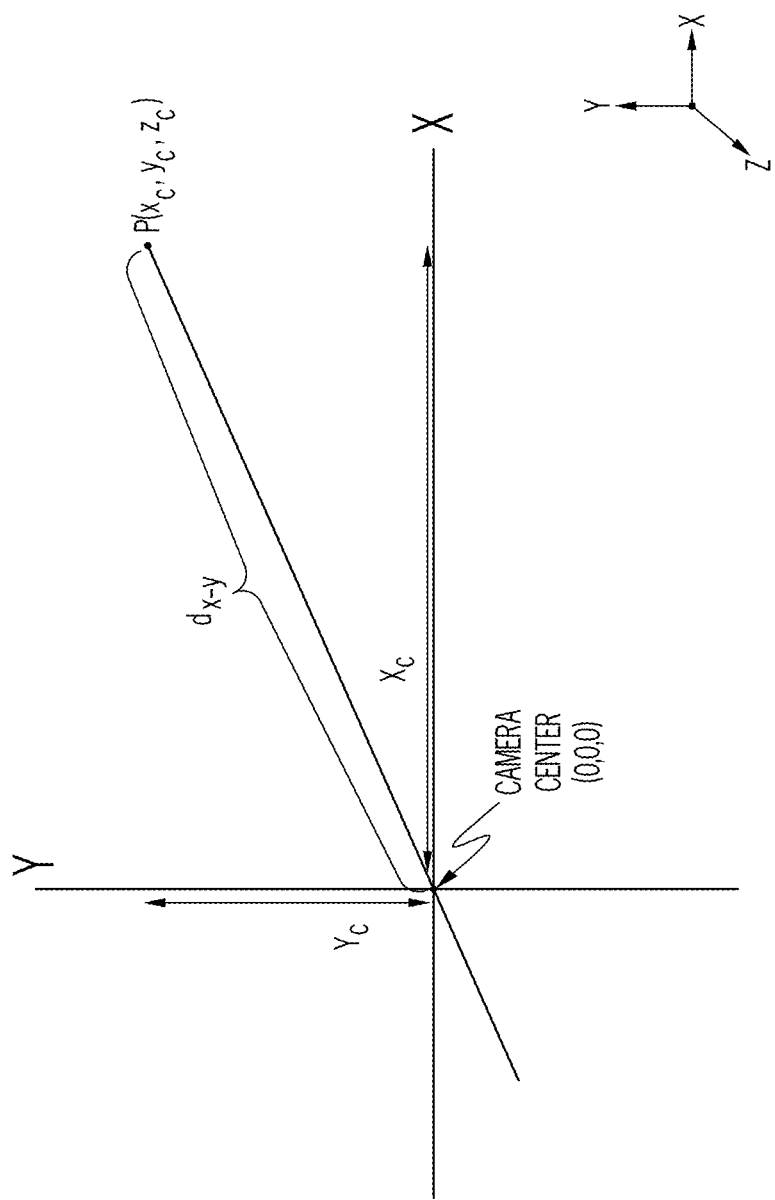

FIGS. 2A-2C illustrate a simple pinhole camera perspective projection model to assist in explaining various aspects of the present invention. The camera 130 is considered to have a camera center located at an origin (0, 0, 0) that defines the camera coordinate system with an X-axis, Y-axis and Z-axis. In FIG. 2A for example the Y-axis is emerging from the surface of the sheet of paper and the X-axis and Z-axis are labeled. An image plane is located a distance, f from the camera center wherein f is the focal length of the camera 130. A small region or location in the physical world scene being imaged by the camera 130 is located at coordinates ($X_C$, $Y_C$, $Z_C$) with the subscript "C" denoting that the coordinates are relative to the camera coordinate system origin. FIG. 2B is similar to FIG. 2A but is from the perspective of the X-axis descending into the sheet of paper and the Y-axis and Z-axis arranged as shown.

Based on the principles of similar triangles, the values x' and y' can be calculated according to:

$$x' = \frac{X_C * f}{Z_C} \qquad \text{EQ. 1}$$

$$y' = \frac{Y_C * f}{Z_C}. \qquad \text{EQ. 2}$$

FIG. 2C depicts the region ($X_C$, $Y_C$, $Z_C$) as it is projected onto the X-Y plane with the Z-axis emerging from the sheet of paper. The units of measure for values f, x' and y' are in terms of length and not "pixels" and, therefore need to be converted to "pixels" in order to determine a particular pixel location in the image. Assuming that the focal length f as measured in pixels in the X-axis direction is $f_x$ and is $f_y$ as measured in the Y-axis direction, and assuming that each pixel has a length $m_x$ in the X-axis direction and a length $m_y$ in the Y-axis direction, wherein each of $m_x$ and $m_y$ are in terms of:

(physical length (e.g., mm))/pixel then pixel values u and v in the image plane corresponding to x' and y' can be calculated according to:

$$u = \frac{X_C * f_x}{Z_C} \qquad \text{EQ. 3}$$

$$v = \frac{Y_C * f_y}{Z_C} \qquad \text{EQ. 4}$$

where:

$$f = f_x * m_x \quad \text{EQ. 5}$$

$$f = f_y * m_y \quad \text{EQ. 6}$$

FIGS. 2A-2C represent a simple perspective projection that considers that there is no camera lens distortion or skew. Furthermore, additional assumptions that can be made include aligning the world coordinate system origin with the camera coordinate system origin such that there is no rotational or translational difference between the two. Initially, it is assumed that the center of the image plane through which the optic axis passes is located in the image plane at pixel location (0, 0). One of ordinary skill will recognize, however, that these simplifying assumptions are not necessary and well-known projection matrices and formulas can be used to account for translations, distortions, rotations, axis, skew, etc.

As mentioned above, the camera 130 captures a respective depth value for each pixel location and this information is to be converted into real world coordinates such that each pixel is transformed into a 3D point that has coordinates relating to a location, or region, in the physical world. Based on the above assumptions, these coordinates happen to be relative to an origin located at the center of the camera 130. Thus, EQ. 3 and EQ. 4 can be re-written as:

$$X_C = Z_C * \frac{u}{f_x} \quad \text{EQ. 7}$$

$$Y_C = Z_C * \frac{v}{f_y} \quad \text{EQ. 8}$$

Figure 3:
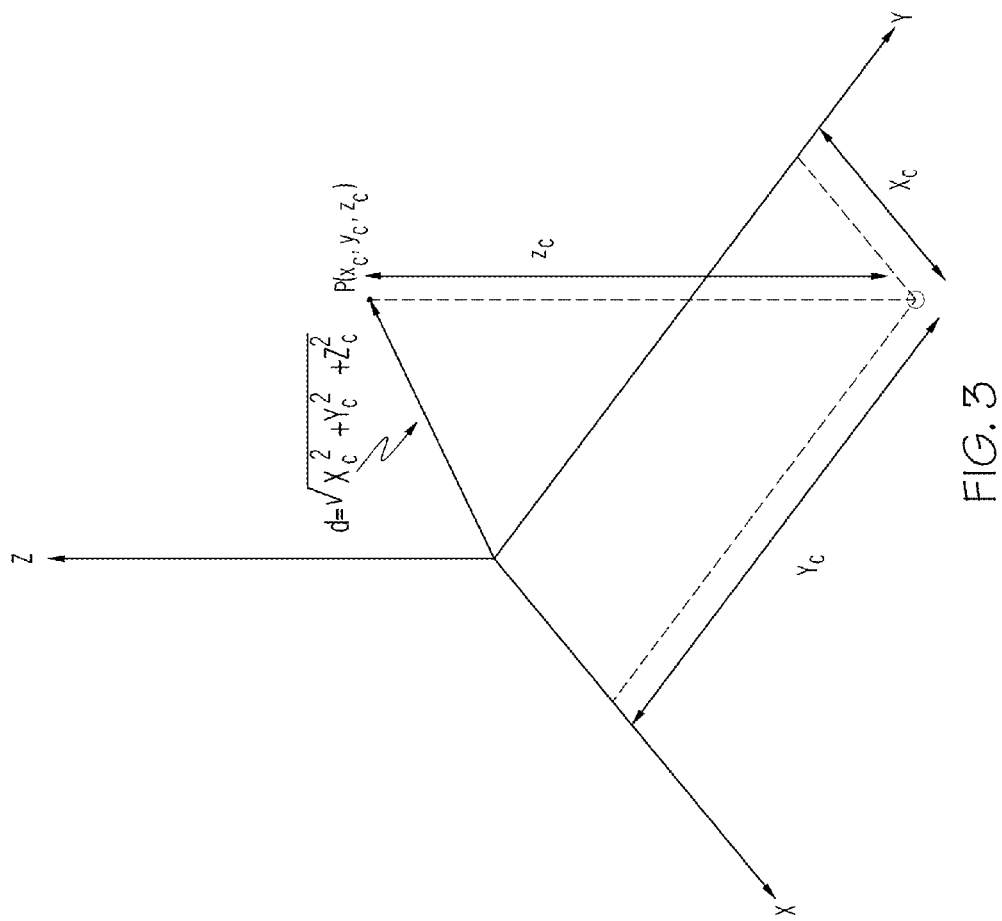
FIG. 3 depicts a geometry of identifying a region in a physical environment in relation to an imaging camera in accordance with the principles of the present invention.

Additionally, the geometry depicted in FIG. 3 illustrates that a distance, d, of the point, or region, $(X_C, Y_C, Z_C)$ from the world (and camera) origin can be calculated according to:

$$d = \sqrt{X_C^2 + Y_C^2 + Z_C^2} \quad \text{EQ. 9A}$$

or $$d = X_C^2 + Y_C^2 + Z_C^2 \quad \text{EQ. 9B}$$

Rearranging EQ. 9B can provide $$1 = d^2 \left( \frac{1}{X_C^2 + Y_C^2 + Z_C^2} \right) \quad \text{EQ. 10}$$

This equation provides a straightforward way to determine, or calculate a value for each of the three coordinates $X_C$, $Y_C$, and $Z_C$. In each instance, both sides of EQ. 10 are multiplied by the square of the coordinate to be solved for and then EQ. 7 and EQ. 8 are used to substitute in known values. For example, to solve for $X_C$, EQ. 10 becomes:

$$X_C^2 = d^2 \left( \frac{X_C^2}{X_C^2 + Y_C^2 + Z_C^2} \right) \quad \text{EQ. 11}$$

$$X_C^2 = d^2 \left( \frac{Z_C^2 * \left(\frac{u}{f_x}\right)^2}{Z_C^2 * \left(\frac{u}{f_x}\right)^2 + Z_C^2 * \left(\frac{v}{f_x}\right)^2 + Z_C^2} \right) \quad \text{EQ. 12}$$

$$X_C^2 = d^2 \left( \frac{\left(\frac{u}{f}\right)^2}{\left(\frac{u}{f_x}\right)^2 + \left(\frac{v}{f_y}\right)^2 + 1} \right) \quad \text{EQ. 13}$$

$$X_C = \frac{d * \frac{u}{f_x}}{\sqrt{\left(\frac{u}{f_x}\right)^2 + \left(\frac{v}{f_y}\right)^2 + 1}} \quad \text{EQ. 14}$$

In a similar way $Y_C$ and $Z_C$ can be solved with:

$$Y_C = \frac{d * \frac{v}{f_y}}{\sqrt{\left(\frac{u}{f_x}\right)^2 + \left(\frac{v}{f_y}\right)^2 + 1}} \quad \text{EQ. 15}$$

$$Z_C = \frac{d}{\sqrt{\left(\frac{u}{f_x}\right)^2 + \left(\frac{v}{f_y}\right)^2 + 1}} \quad \text{EQ. 16}$$

Thus, according to the above equations, every pixel location having pixel coordinates (u,v) on the image plane along with its associated depth value d can be transformed into a corresponding location in the physical world having coordinate components $(X_C, Y_C, Z_C)$. The units of measurement for these coordinates can be in the same units of measurement (e.g., millimeters) as the distance d value determined by the camera 130.

Figure 4B:
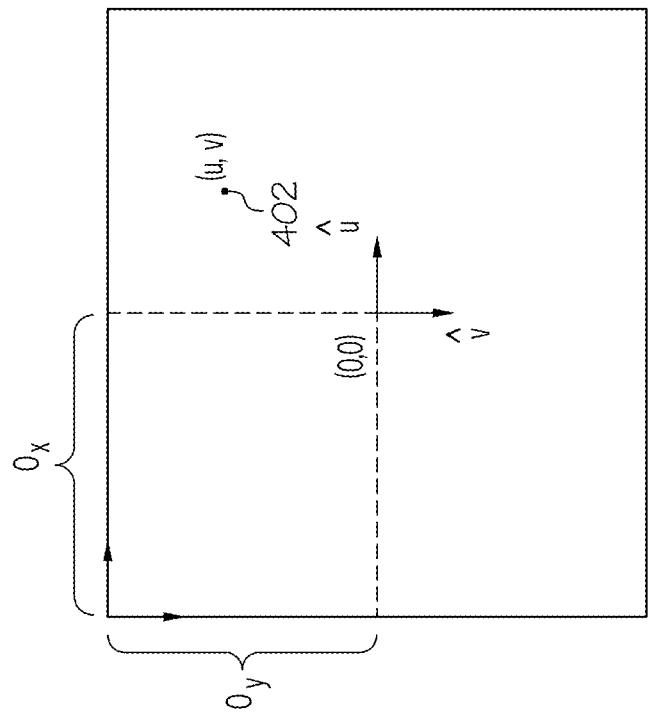
FIG. 4A and FIG. 4B illustrate an image plane having a respective origin point in two different locations in accordance with the principles of the present invention.
Figure 4A:
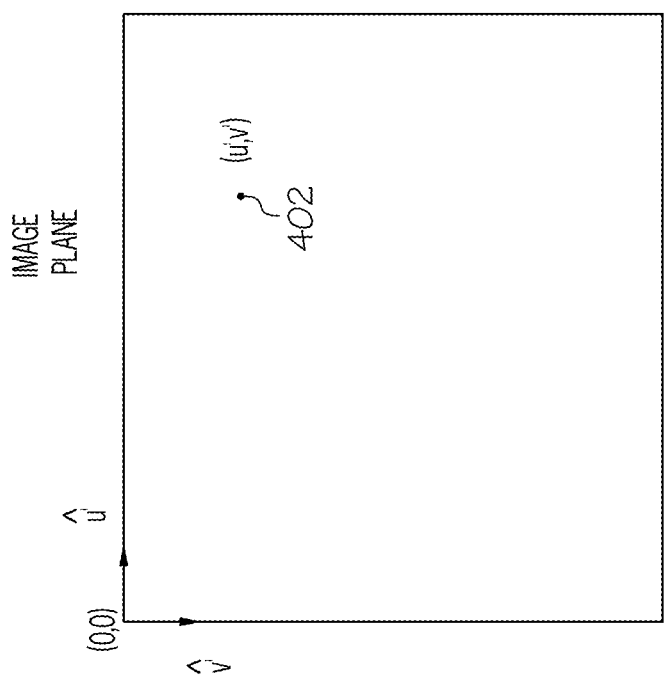

One of the initial assumptions in the above equations is that the optic axis passed through the origin (0,0) of the image plane from which pixel locations are measured. An example image plane utilizing this assumption is depicted in FIG. 4B. If, however, the origin (0,0) is located somewhere else such as, for example, in the top left corner, then there are offset values $O_x$ and $O_y$ that can be used before applying EQs. 14-16. In FIG. 4A and FIG. 4B, the pixel 402 is located at the same physical spot on the image plane but its pixel location, or pixel coordinates can vary depending on where the origin (0,0) is defined to be. If, for example, the imaging camera 130 calculated pixel coordinates (u', v') from an origin positioned at the top left corner of the image plane, then these pixel coordinates (u', v') can be translated into pixel coordinates (u, v) calculated from an origin positioned where the optic axis passes through the image plane.

$$u = u' - O_x \quad \text{EQ. 17}$$

$$v = v' - O_y \quad \text{EQ. 18}$$

These translated pixel coordinates (u, v) can then be used in the above equations to find set of 3D coordinates along with the depth value d that the imaging camera associated with the untranslated pixel coordinates (u', v').

The 3D coordinates calculated for each of the pixels of the depth image can be arranged as a 3D point cloud that is an array with a respective entry for each of the pixel locations of the image. For example, an imaging camera 130 that has an image plane with a size of 500×500 pixels would have 250,000 individual pixels or pixel locations. Thus, the array of the 3D cloud point would have an index to 250,000 individual entries and each entry would include a set of coordinates (or coordinate components) $(X_C, Y_C, Z_C)$.

Figure 7A:
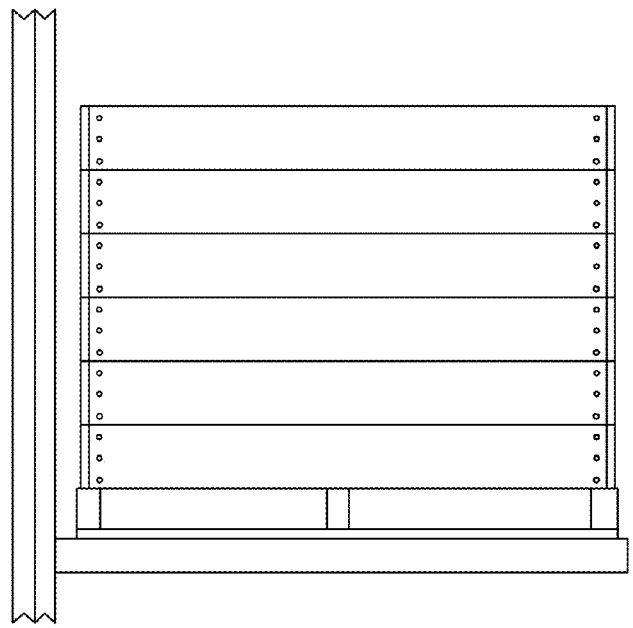
FIG. 7A and FIG. 7B illustrate two different visualizations of a physical environment in accordance with the principles of the present invention.
Figure 7B:
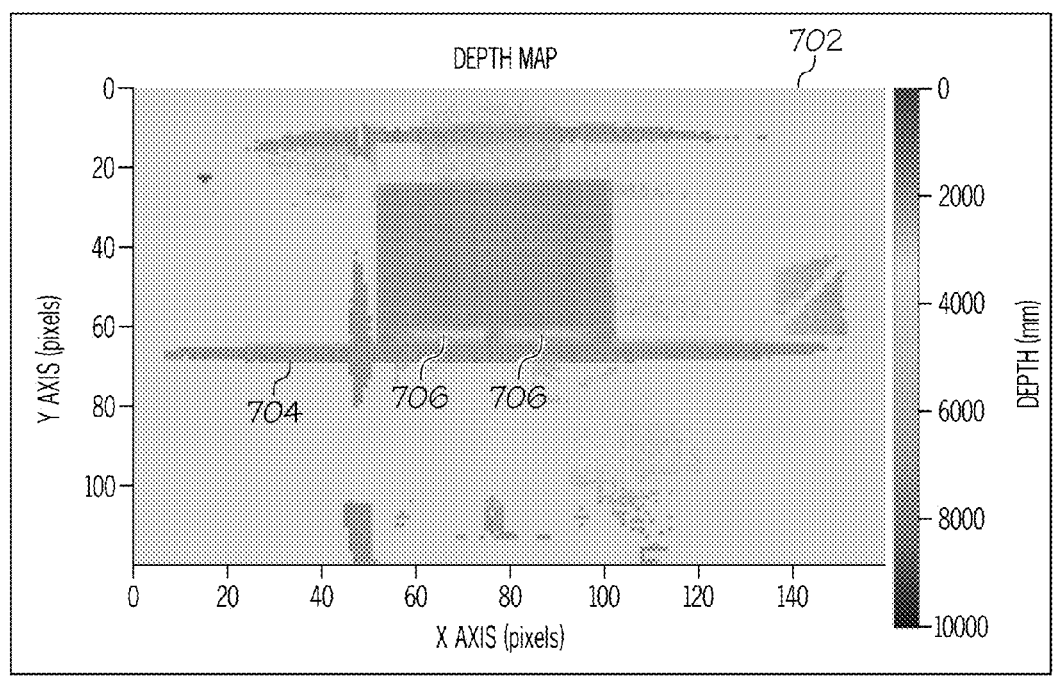

Another way the elements of the 3D point cloud can be arranged is in a depth map that allows the 3D point cloud to be visualized. FIG. 7A illustrates an example scene that can be captured in an image by the camera 130 and FIG. 7B illustrates a depth map 702 constructed from the pixels of that image. The example image size is 160×120 pixels and, thus, there are 19,200 3D points in the array 3D point cloud that can be indexed by an index variable that ranges from 0 to 19,199. Elements of the depth map 702 can then be arranged as columns and rows, mimicking the arrangement of the pixels in the image plane, that define a width (e.g., 160) and a height (e.g., 120) such that the columns can be indexed by an index variable that ranges from 0 to 159 and the rows can be indexed by an index variable that ranges from 0 to 119. An element of the depth map can be denoted by dm[g,h] which corresponds to an element of the array 3D point cloud that can be denoted by pc[g+(h*width)]. In other words, an example element of the depth map dm[17, 22] corresponds to the point cloud element pc[3537]. Thus, the value that is plotted in the depth map 702 at element dm[17,22] is the $Z_C$ coordinate component value of the point cloud element pc[3537]. The depth map 702 provides a visualization of the depth information from the points in the 3D point cloud that can reveal features such as pallet openings 706 and rack faces 704.

The points in the 3D point cloud can also be arranged as an "organized point cloud". The organized point cloud, similar to the distance map, can be arranged in rows and columns corresponding to the arrangement of the pixels of the acquired image. Thus, each element of the organized point cloud can be denoted by opc[g, h], where the index variables g and h are the same as those described above with respect to the distance map. The difference is that each element of the organized point cloud includes all the coordinate component values ($X_C$, $Y_C$, $Z_C$) for a 3D point whereas a depth map element has a value representing just the $Z_C$ coordinate component. Each element of the organized 3D point cloud could also include a value that corresponds to its index value in the array 3D point cloud; although that value could also be calculated based on the values g and h as discussed above with respect to the depth map. In the array structure of the 3D point cloud it is difficult to determine which elements correspond to adjacent or neighboring pixels in the image. However, because the organized point cloud is arranged similar to the pixels of the image, "neighboring" or "adjacent" elements of the 3D point cloud can be identified and used for analysis.

Figure 8:
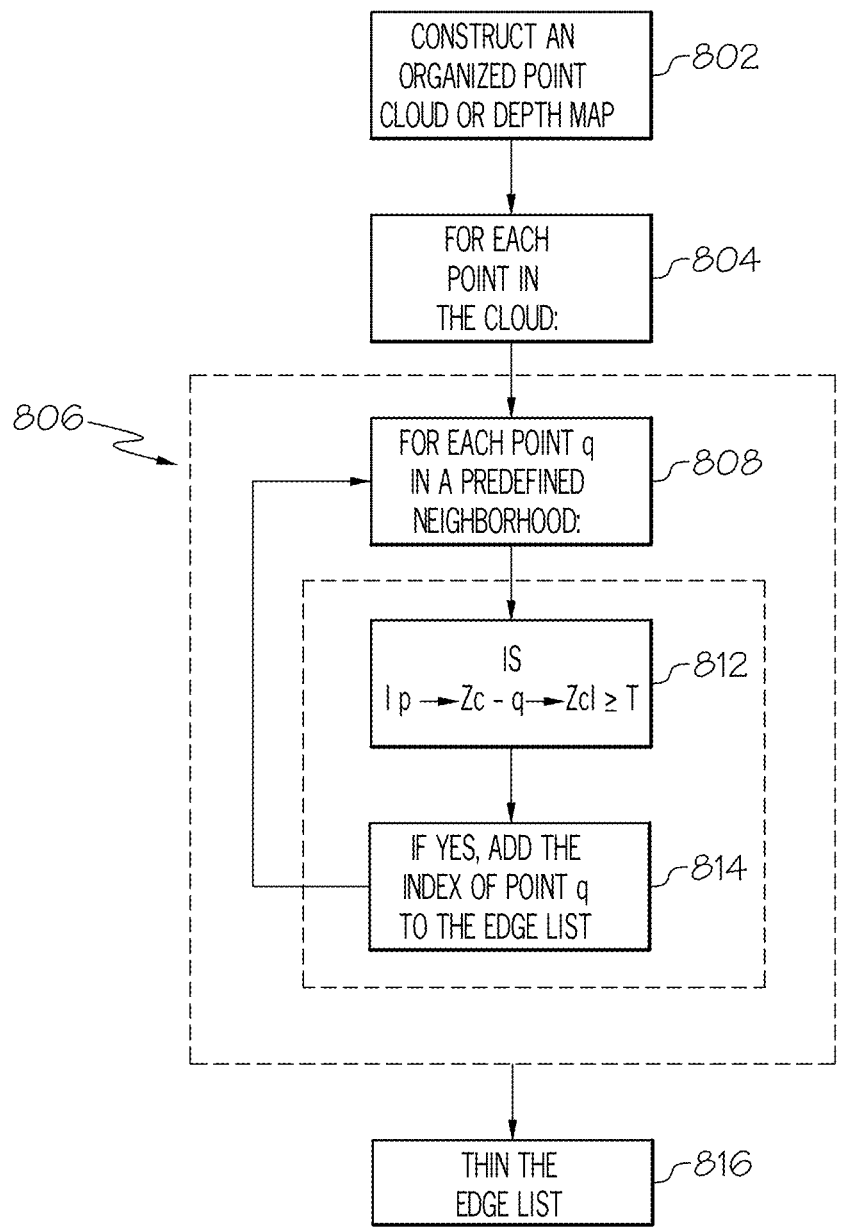
FIG. 8 is a flowchart of an example algorithm for identifying edges in a 3D image in accordance with the principles of the present invention.

One step in the analysis described earlier is to determine what points of the 3D point cloud belong to an edge. In the flowchart of FIG. 8 and later discussions below, the shorthand notation p→$Z_C$ is used to denote the value of the $Z_C$ coordinate component of the 3D point p whether that point is in the array 3D point cloud, the organized point cloud, or the depth map. In general, edge detection can be performed in accordance with the example flowchart of FIG. 8. In step 802 an organized point cloud or a depth map can be constructed and, then in step 804 and the steps grouped as 806, for each point p in the point cloud, p→$Z_C$ is compared with q→$Z_C$ of all 3D points q in a predefined neighborhood around p. Thus, in step 808, the flowchart loops through all the points q in the predefined neighborhood so that a determination can be made in step 812 whether |(p→$Z_C$)− (q→$Z_C$)|≥T. One example predefined neighborhood consists of the 8 points that are adjacent to the point p in the organized point cloud. An example threshold value T can be, for example, between 20 and 40 mm.

If, for any of the predefined neighborhood points, the magnitude of the difference between the two $Z_C$ values is greater than the threshold value T, then the index of the neighbor point is added to a list of "edge points", in step 814. Thus, an "edge" refers to a discontinuity in the Z-axis between two points that correspond to adjacent pixels in the image plane.

Edge detection in this manner is completed for each of the points in the organized 3D point cloud to build a complete list of edge points. The indices used to identify points in the edge list can be the index value of a point in the array 3D point cloud or the pair of index values used to identify a 3D point in the organized point cloud. In addition to generating the edge list, an edge organized point cloud could be constructed such that a value of the $Z_C$ coordinate component for any point not in the edge list could be set to "not a number". Thus, only edge points in the edge organized point cloud would have a useful $Z_C$ coordinate component. A point or value which is set to "not a number" is a placeholder. It still exists, but does not contain any usable value. For example, a point p where p→$Z_C$ exceeds the camera's maximum range could be considered "not a number" in the Z-axis direction and its $Z_C$ coordinate component set accordingly. This convention allows identification of the elements of the 3D point cloud that can be skipped for some analysis steps.

An edge detection algorithm can sometimes produce thick lines for edges where there is no single, sharp change in the $Z_C$ values of neighboring points. Thus, in step 816, points can be removed from the edge list in order to thin the detected edges. One example edge-thinning technique is to identify any edge point that has all 8 of its neighboring points also included in the edge list. Any such identified point can have its $Z_C$ value set to "not-a-number".

One of ordinary skill will recognize that there are many different edge detection algorithms that can be used and that FIG. 8 is a general framework for edge detection and thinning. One specific algorithm that can be used is known as the Canny Edge Detector. In the Canny Edge Detector, the $Z_C$ values of the point p and its 8 neighboring points, for example, are weighted and added together to generate a gradient value. If this gradient value matches predetermined criteria, then that point p is considered to be an edge point. In particular, if a gradient value for point p is greater than an upper threshold, then that point is accepted as being located on an edge. If the gradient value is below a lower threshold, then that point is considered to not be located on an edge. If the gradient value is between the two thresholds, then the point is accepted as an edge point only if at least one of its adjacent neighboring points has a gradient value above the upper threshold. As an example, a lower threshold value of 20 and an upper threshold value of 40 were used to generate the edge organized point cloud of FIG. 9B.

Figure 9A:
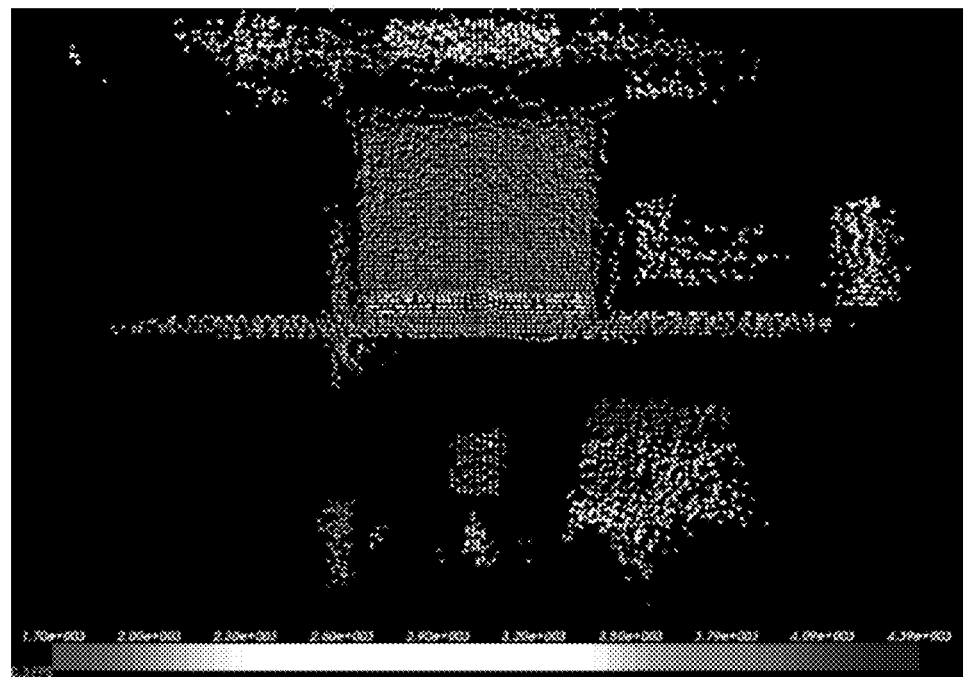
FIGS. 9A and 9B depict a visualization of applying the algorithm of FIG. 8 to a 3D point cloud in accordance with the principles of the present invention.
Figure 9B:
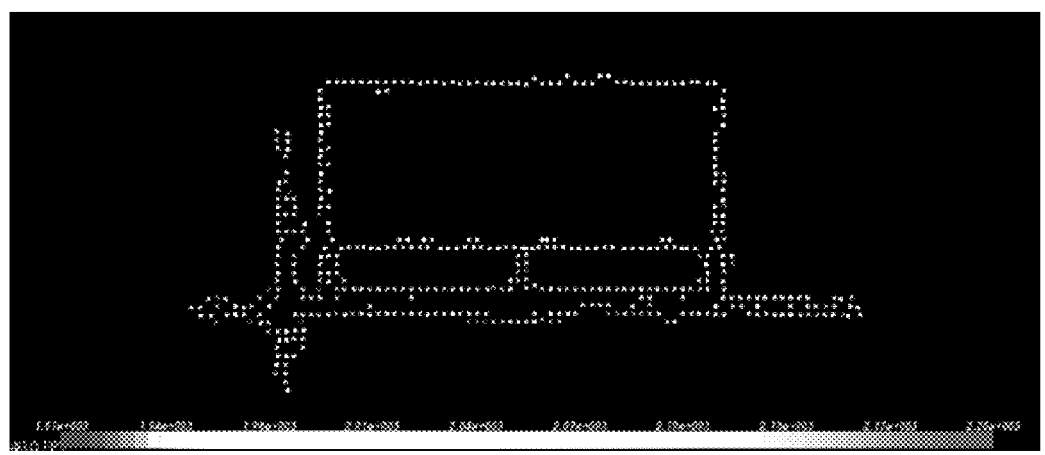

The edge organized point cloud can be plotted, or visualized, by displaying the $Z_C$ value for any point in the edge list and displaying "not a number" as black. FIG. 9A is a plot of the $Z_C$ values of an organized point cloud and FIG. 9B is a plot of an edge organized point cloud after applying an edge detection and thinning algorithm similar to that of FIG. 8.

Figure 10:
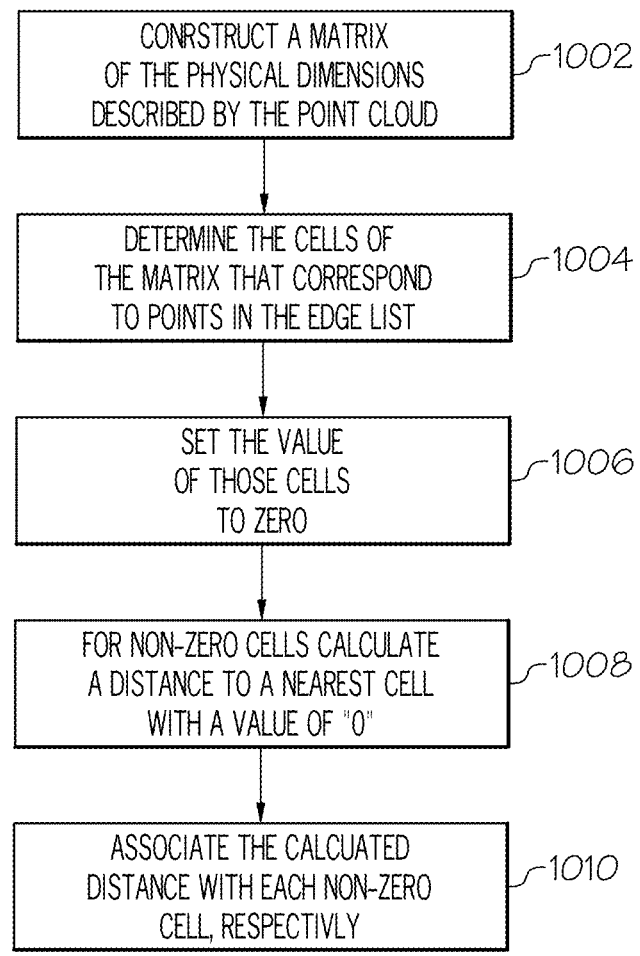
FIG. 10 is a flowchart of an example algorithm for creating a distance map in accordance with the principles of the present invention.

Once an edge list is constructed, then step 508 from FIG. 5 can be performed. Some of the details of step 508 are provided in the flowchart of FIG. 10. In step 1002, a matrix is constructed that is related to the physical dimensions described by the 3D points in the point cloud or organized point cloud. In particular a new edge point cloud can be constructed that includes only those 3D points that are identified in the edge list that have a $Z_C$ value that is something other than "not a number". This new edge point cloud is analyzed to determine the highest value of $X_C$ for all of the points and the highest value of $Y_C$ for all the points. The size of the matrix is such that the number of columns is based on the highest $X_C$ value and the number of rows based on the highest $Y_C$ value. An example matrix 1101 is shown in FIG. 11.

A particular cell, e.g., 1102, of the matrix 1101 can be denoted by M[a, b] where a ranges from a value between 1 and the highest $X_C$ value (which for example could be denoted by i) and b ranges from a value between 1 and the highest $Y_C$ value (which for example could be denoted by j). The values in the cells of the matrix 1101 are initially set to generate a matrix with each of the cells corresponding to a point in the new edge point cloud being set to "0" for example, as shown in FIG. 11B. The image analysis computer 110, for example in step 1004, could process each 3D point, e, in the new edge point cloud in order to determine e→$X_C$ and e→$Y_C$. These values could then be used to set the value of a particular cell of the matrix 1101. In particular, the cell M[e→$X_C$,e→$Y_C$] could be set to "0", in step 1006. A distance transform can then be performed, in step 1008, on the non-zero valued cells of matrix 1101 to place a value in each such cell that represents its distance to the nearest cell having a value of "0", as shown in FIG. 11C. In other words, the distance between a cell and its nearest edge point is calculated. The calculated non-zero distance values placed in the example cells of FIG. 11C range from $d_1$ to $d_7$.

The distance between each cell and the closest cell having a value of "0" can be calculated according to the Euclidian distance between these two cells. For example, the Euclidian distance between a first non-zero valued matrix cell M[$a_1$, $b_1$] and a second zero-valued matrix cell M[$a_2$, $b_2$] can be calculated according to:

$$\text{Euclidian distance} = \sqrt{(a_1-a_2)^2+(b_1-b_2)^2}$$

However, there are instances where a precise Euclidian distance is not necessary and the computational overhead of calculating it can be avoided by estimating that distance. While there are many known distance transformations that estimate a Euclidian distance, examples one that may be used include: the city block method, the chessboard method, the octagonal method, the chamfer 3-4 method, and the chamfer 5-7-11 method. One of ordinary skill will recognize that other distance transforms can be used as well without departing from the scope of the present invention. Regardless of the method used to calculate a distance value for each non-zero cell, that calculated distance value is associated, in step 1010, with its respective cell of the matrix 1101 in order to construct a distance map as shown in FIG. 11C.

Figure 11A:
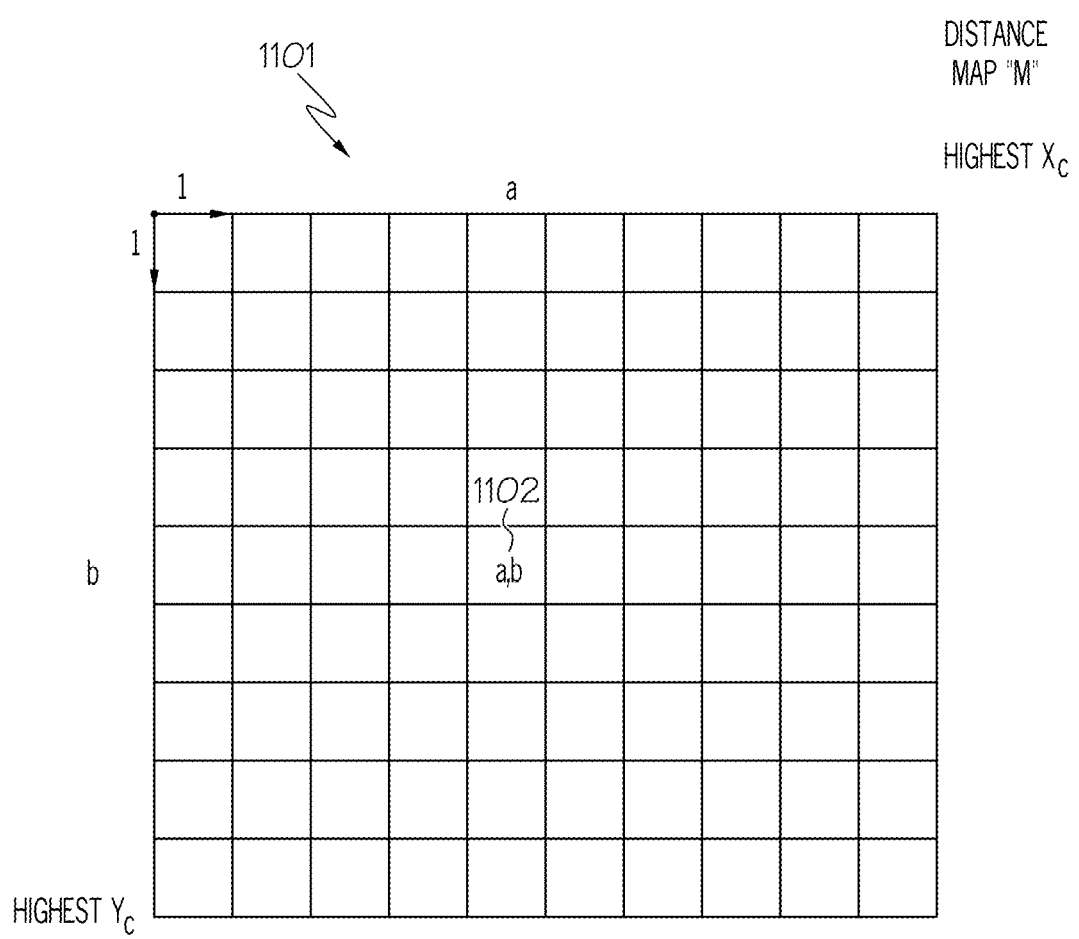
Figure 11B:
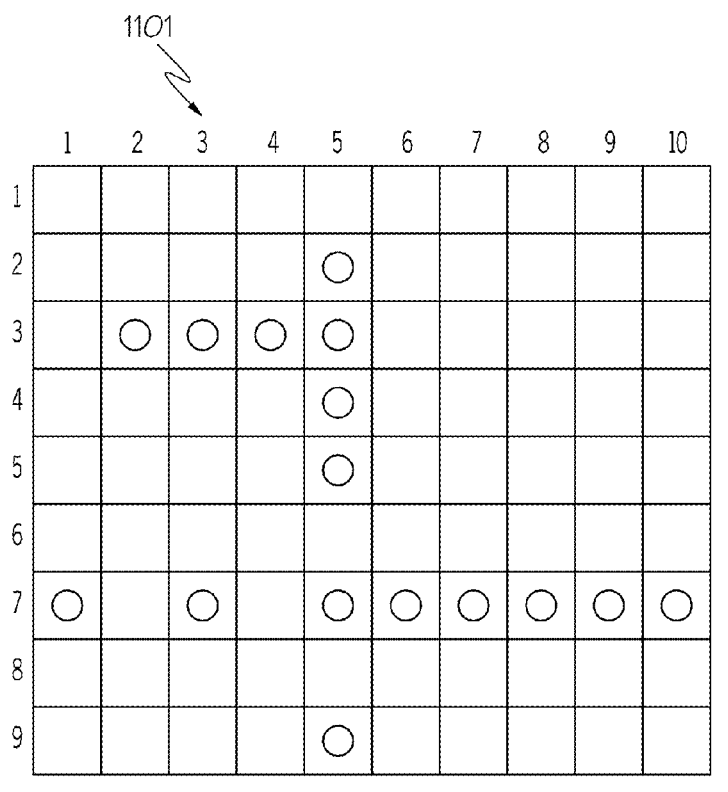

The matrices of FIG. 11A-FIG. 11C are provided merely by way of example and the actual distance map that would result from the edge point cloud of FIG. 9B would have many more cells and have distance values that vary more than those depicted in FIG. 11C. If for example, each distance value for a cell of the distance map corresponds to a different gray level, the edge point cloud of FIG. 9B would generate a distance map as shown in FIG. 11D.

Not only does each cell of the distance map have an associated value that indicates a distance from that cell to a nearest edge but because of the way the matrix 1101 is constructed, each element, or cell, of the matrix also represents a distance from that cell to an origin point of the distance map. In particular, the pair of index values used to refer to a cell of the distance map also reveal the distance between that cell and the origin point of the distance map. For example, matrix cell, or element, M[a, b] is a distance of a millimeters from the origin point of the distance map in the x direction and is a distance of b millimeters from the origin point of the distance map in the y direction. As a result, with respect to two different cells of the distance map M[$a_3$, $b_3$] and M[$a_4$, $b_4$] there is a distance of |$a_3$−$a_4$| millimeters between them in the x direction and is a distance of |$b_3$−$b_4$| between them in the y direction. The units of "millimeters" is a result of the 3D coordinate components ($X_C$, $Y_C$, $Z_C$) being in physical units of measurement such as, for example, millimeters. If the 3D coordinate components were in some other units of measurement, then the resulting distance map could be as well. Also, as discussed more fully below, the coordinate component values of the edge organized point cloud and the distance map could for example be converted in scale from millimeters to centimeters to reduce computation overhead of calculating the distance map and subsequent analysis steps. In other words, even though the values of $X_C$ and $Y_C$ for an edge point are calculated and stored in terms of millimeters, they can be converted to centimeters to determine a cell of the distance map corresponding to that edge point.

Figure 11D:
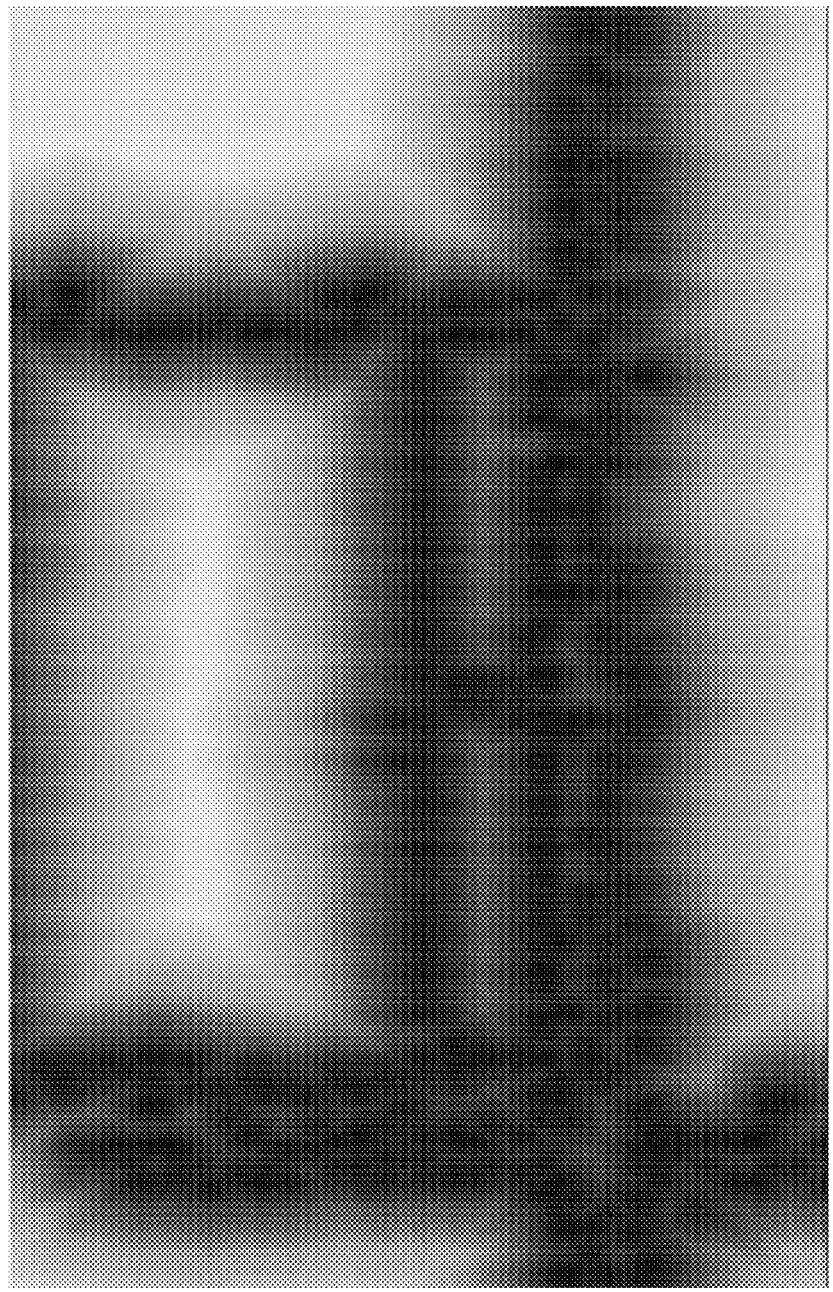

Once the distance map, as shown in FIG. 11D, is constructed and all its cells populated with a respective distance value it can be utilized along with a template to identify portions of the distance map that are similar to the template. The template can for example be a rack template or a pallet template. The template is a point cloud describing one or more edges of the structure it represents. For example, the rack template includes points that describe an edge map of a rack and the pallet map can describe an edge map of the pallet openings.

An example rack template is shown in FIG. 12A and an example pallet template is shown in FIG. 12B. Each template is constructed essentially the same so only a detailed explanation of the rack template is provided. The template typically will have elements, or points, that are the same dimensions as the distance map although appropriate scaling between two different sizes can be accomplished. For example, as mentioned above, the distance map can have cells that could represent centimeters rather than millimeters. As such, rather than having a distance map that is 2000×2000 cells, it could be 200×200 cells. Accordingly, the template elements, or points, will be in terms of centimeters as well.

The rack template of FIG. 12A may then also have a plurality of template points that can be defined by two coordinate components (m, n) each of which has a value in physical units of measurement such as centimeters, for example. In FIG. 12A, the rack template comprises eighty points or, in other words, there are eighty points in the point cloud that describes the rack template. This template point cloud can be arranged and stored as an array of elements such that each element holds the respective two coordinate components (m, n) of one of the eighty points. Two of those points are explicitly identified in FIG. 12A; one is point 1201 that has coordinate values (1, 1) and a second point 1202 that has coordinate values (975, 66). Each of the 78 other points of the rack template point cloud have their own unique coordinate values. Each of the points of the rack template represents one square centimeter in the physical world and also one cell of the distance map. Thus, point 1202 in the template is 65 centimeters below point 1201 and this distance is approximately the width of the face of a rack between its top edge and its bottom edge. Different size racks would therefore have different size templates.

As for the pallet template of FIG. 12B, this template describes the edges around two openings of the pallet in which forks can be inserted. Each opening is defined by 48 separate points resulting in the point cloud for this template having 96 points. For each opening, a left-most point is about 52.5 cm from a right-most point, and the top edge and bottom edge are separated by about 10 cm. Thus, this pallet template, like the rack template, can be utilized directly with a distance map having its cells sized in centimeters without needing to adjust the size or scale of the template.

In accordance with the principles of the present invention, a template is moved across a distance map, or sometimes called "a distance transform map", to determine where the template best fits on that map. The number of template points of the rack and/or pallet templates of FIGS. 12A and 12B as well as the number of cells in the distance map of FIG. 11D prevent them from easily being described and illustrated but the principles of their operation are described with respect to the series of FIGS. 13A-13D.

In the figures, the example template 1302 potentially has 12 cells or points that could possibly correspond to an edge and, in the example template 1302, four of the points are selected to represent or model an edge. The four points are (1,1), (4,1), (4,2) and (4,3). Thus, the point cloud for the example template 1302 has 4 points. There is one point 1304 of the example template 1302 that can be used as a reference point or "origin" of the template. For example, when point (1,1) of the example template 1302 is overlaid on the distance map 1102 as shown in FIG. 13B, the point (1,1) of the example template 1302 overlays cell (1,1) of the distance map 1101. This occurrence corresponds with the template 1302 having its origin associated with cell (1,1) of the distance map and represents placing the template 1302 at one "location" (i.e., 1,1) on the distance map 1101. At this location, the points of the example template 1302 are aligned with a plurality of cells of the distance map 1101 such as cells (1,1), (4,1), (4,2) and (4,3) so that a cost function can be calculated at the location (1,1) of the distance map 1101 based on the respective distance value in each of the 4 cells that are aligned with the example template 1302.

| Template Positioned at Cell Location (1, 1) | |
|---|---|
| Cells Aligned with Template Points | Distance Value of the Cell |
| (1, 1) | $d_3$ |
| (4, 1) | $d_1$ |
| (4, 2) | $d_1$ |
| (4, 3) | 0 |

A cost function, such as a root mean square can be calculated for the template being located at this location of the distance map according to:

$$RMS\ cost\ function = \frac{1}{3}\sqrt{\frac{1}{4}(d_3^2 + d_1^2 + d_1^2 + 0^2)}$$

In the above equation, the multiplication factor "⅓" is used by way of example to account for the distance map being calculated using a 3-4 chamfer.

Figure 13A:
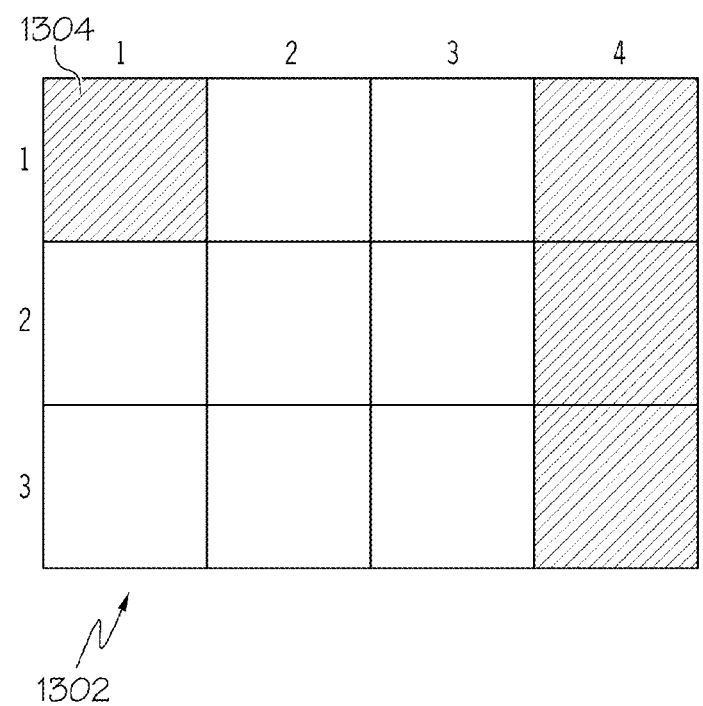
Figure 13C:
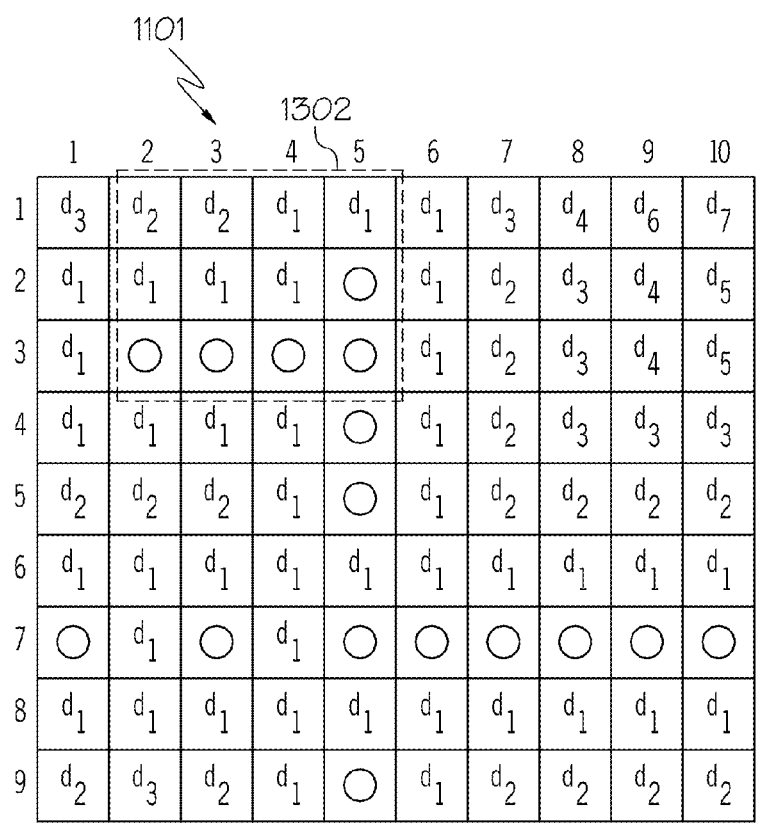

The example template 1302 can then be moved to a new location (2,1) on the distance map 1101 such as the one shown in FIG. 13C. At this location, the points of the example template 1302 are aligned with a plurality of cells of the distance map 1101 such as cells (2,1), (5,1), (5,2) and (5,3) so that a cost function can be calculated at the location (2,1) of the distance map 1101 based on the respective distance value in each of the 4 cells that are aligned with the example template 1302.

| Template Positioned at Cell Location (2, 1) | |
|---|---|
| Cells Aligned with Template Points | Distance Value of the Cell |
| (2, 1) | $d_2$ |
| (5, 1) | $d_1$ |
| (5, 2) | 0 |
| (5, 3) | 0 |

A cost function, such as a root mean square can be calculated for the template being located at this location of the distance map according to:

$$RMS\ cost\ function = \frac{1}{3}\sqrt{\frac{1}{4}(d_2^2 + d_1^2 + 0^2 + 0^2)}$$

The example template 1302 can eventually be moved to a new location (2,3) on the distance map 1101 such as the one shown in FIG. 13D. At this location, the points of the example template 1302 are aligned with a plurality of cells of the distance map 1101 such as cells (2,3), (5,3), (5,4) and (5,5) so that a cost function can be calculated at the location (2,3) of the distance map 1101 based on the respective distance value in each of the 4 cells that are aligned with the example template 1302.

| Template Positioned at Cell Location (2, 3) | |
|---|---|
| Cells Aligned with Template Points | Distance Value of the Cell |
| (2, 3) | 0 |
| (5, 3) | 0 |
| (5, 4) | 0 |
| (5, 5) | 0 |

A cost function, such as a root mean square can be calculated for the template being located at this location of the distance map according to:

$$RMS\ cost\ function = \frac{1}{3}\sqrt{\frac{1}{4}(0^2 + 0^2 + 0^2 + 0^2)}$$

The example template 1302 can, for example, be located at each of the locations on the distance map 1101 where the entire template 1302 can fit without extending past an edge of the distance map 1101. In the above example, the example template 1302 can be overlaid, or located, on any of the 49 different distance map locations from (1,1) to (7,7) and a respective cost function value calculated for each of those 49 locations.

The value of the cost function for a particular location on the distance map 1101 reflects how similar that location is to the edge structure modeled by the points of the example template 1302. The lower the cost function value for a location, the more that location is similar to the points of the example template. In the placements of the example template 1302 illustrated in FIGS. 13C-13D, the cost function value at (2,3) is "0" which means that location on the distance map likely corresponds to a real world location where structure similar to that modeled by the template is located. Accordingly locating a matching rack and/or pallet in a 3D image involves locating a template at a plurality of different locations on the distance map, wherein at each of the plurality of different locations, the template is aligned with a plurality of cells and has an origin associated with one of the cells, so that a corresponding cost function value can be calculated for that associated one cell. Based on the plurality of calculated cost functions a "best-fit" location on the distance map can be identified and can be used to determine where a rack and/or pallet may be located in a physical environment.

Figure 14:
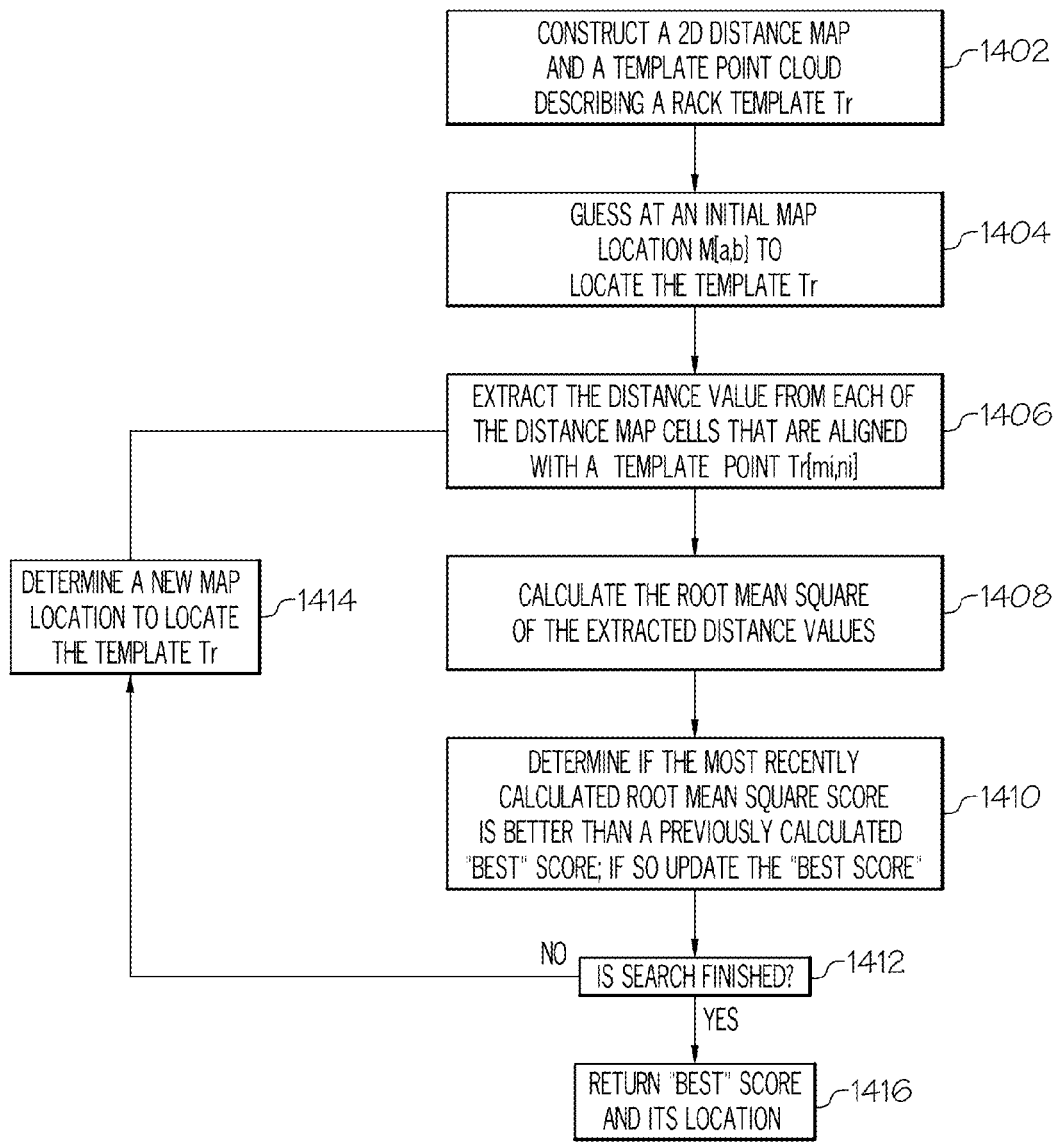
FIG. 14 is a flowchart of an example algorithm for applying a rack template to a distance map in accordance with the principles of the present invention.

FIG. 14 is a flowchart of an example algorithm for one iteration of applying a template to a distance map in accordance with the principles of the present invention. The algorithm of FIG. 14 would be performed each time an image is to be analyzed in accordance with the principles of the present invention. In step 1402, as a preliminary matter, a rack template $T_R$ point cloud is defined and a distance map M is constructed as described above. Then, at step 1404, the template $T_R$ is overlaid at an initial location on the map M. The initial location can be selected in a number of different ways. For example, the initial location can be a lower left corner (that allows the template $T_R$ to fully fit over the map M without extending past any edge of the map M. The initial location could be randomly selected or it could be a center cell location of the map M. If previous images have been analyzed and a location matching the rack template $T_R$ was previously identified at a particular location, then the initial location in step 1404 can be that previously identified location.

In step 1406, the distance values are extracted from the cells of the map M that are aligned with template points. As described above, with respect to FIGS. 12A and 13A-13D, the rack template $T_R$ has a point that is considered the origin point of the template $T_R$ and the other template points are described by 2D coordinates relative to this origin point. So, if the template $T_R$ is overlaid at location M[a, b] and each of the 80 template points has 2D coordinate values that can be denoted by $T_R(m_i, n_i)$, then each of the 80 cells of the distance map referenced by $M[a+m_i, b+n_i]$ are aligned with the 80 template points.

These extracted distance values can be combined together in step 1408 in various manners to calculate a value of a cost function, or a "score" that indicates how well the location on the map M where the template $T_R$ is located matches the edges described by the template $T_R$. The root mean square of the distance values is one example score that can be calculated. In step 1410, a determination is made as to whether the current score indicates a better match (i.e., is lower) than any previously calculated score at a different position of this distance map M. If so, then the present score becomes the new "best" score and the location on the distance map M associated with this "best" score is retained as well. Otherwise, the "best" score remains unchanged.

In step 1412, a determination is made as to whether the search for an area of the distance map M that matches the rack template $T_R$ is finished. The criteria for ending a search can vary without departing from the scope of the present invention. There may be a maximum number of map locations that can be tried. For example, if the template $T_R$ will fit on the distance map M at 40,000 locations, then the search could end once an arbitrary number (e.g., 20,000) of those locations have been tried. Alternatively, all 40,000 of those locations may be tried before ending the search. The search could also end if a "best" score is found that exceeds some threshold or confidence level that a match has been found.

If the search is not finished, then in step 1414, a determination is made as to the next location on the map M to overlay the rack template $T_R$ so that the next "score" can be calculated for this new map location. The next map location can be a cell that is adjacent to the present location of the rack template $T_R$. The neighboring cells could be selected so that the template $T_R$ is successively placed so that it travels down and to the right (or up and to the left). The neighboring cells could, for example, be chosen so that the rack template $T_R$ is successively placed so that it travels in an ever expanding spiral around the initial location selected in step 1404. In order to reduce the number of cells tested in a search, the two neighboring cells in one direction may be skipped such that the template $T_R$ is overlaid on the map M on every third cell.

If the search is finished, then the algorithm identifies, in step 1416, the "best" score and its associated location (denoted $M[a_r, b_r]$) on the distance map M.

Figure 15:
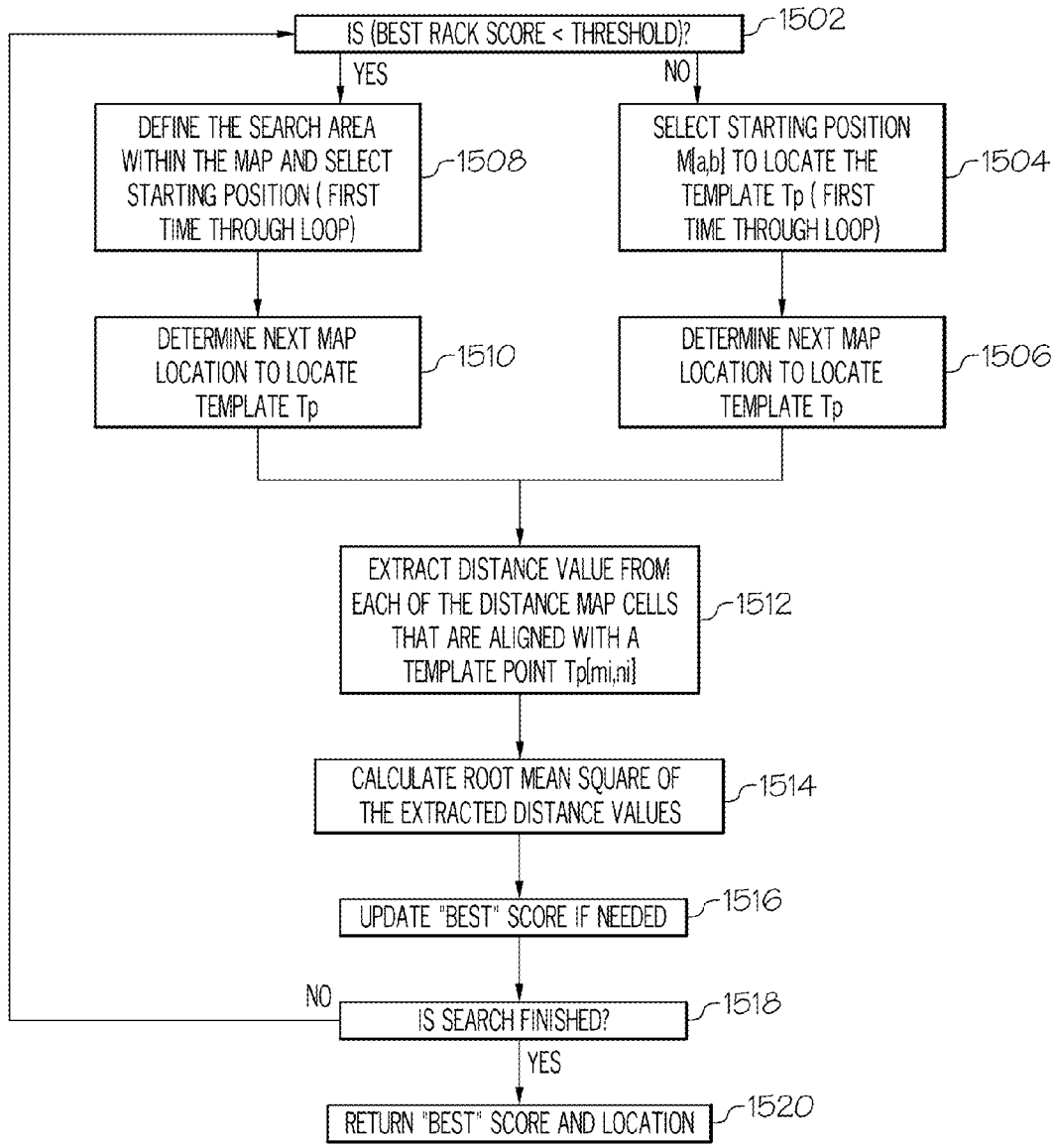
FIG. 15 is a flowchart of an example algorithm for applying a pallet template to a distance map in accordance with the principles of the present invention.

FIG. 15 is a flowchart of an example algorithm for applying a pallet template to a distance map in accordance with the principles of the present invention. Performing a search for a location on the distance map M that matches a pallet template $T_P$ is substantially the same in principle as the search algorithm for a rack described with respect to FIG. 14.

However, to begin the pallet search, a determination is made in step 1502 as to whether the best rack score that was calculated for the distance map M is less than a predetermined threshold or confidence value. For example, a threshold of 1.75 centimeters could be selected such that any best rack score below that value would indicate that a rack was located during the search algorithm of FIG. 14.

If the best rack score is above the threshold value, then step 1504 is performed the first time through the algorithm to select an initial map location M[a, b] to locate the template $T_P$. On subsequent loops through the algorithm, step 1506 is performed to select a new location on the map M to locate the pallet template $T_P$. As described above with respect to the rack template $T_R$, the starting location and subsequent locations for the template $T_P$ can be selected in a number of different ways.

Figure 16:
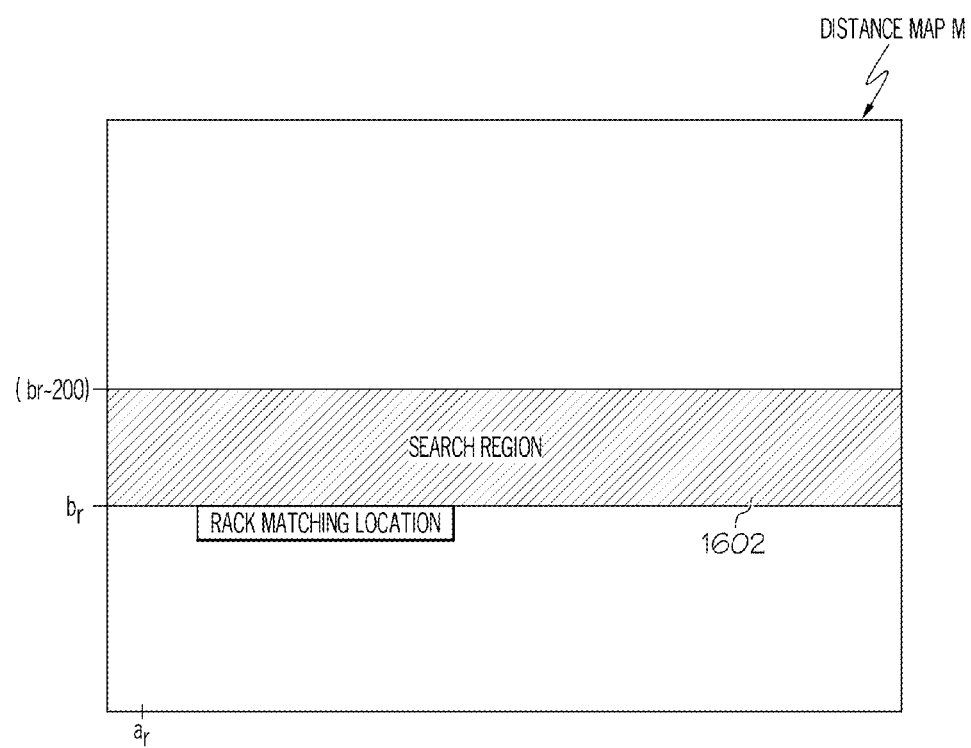
FIG. 16 is an example pallet search region of a distance map in accordance with the principles of the present invention.

If the best rack score is below the threshold, then the location associated with the best rack score can be used to define a search area for locating the pallet $T_P$. Assuming that the location of the reference origin of the distance map is the top left corner (as shown in FIG. 11A) and the points of the pallet template $T_P$ are determined according to the pallet template of FIG. 12B, then a search region to search for a pallet can be defined as shown in FIG. 16. If it is assumed that the location $M[a_r, b_r]$ associated with the best rack score reveals $b_r$ as a y-coordinate value associated with the top edge of the rack template, then the pallet search region can begin above this point as the pallet is assumed to be sitting on the rack. The pallet search region 1602 can have an upper bound that is based in part on the size of the pallet template $T_P$. In the example pallet template of FIG. 12B, the largest coordinate value in the y-direction of any template point is "100". The height of the search region 1602 can be defined as twice that maximum coordinate value (i.e., "200"). There is no assumption made about an x-direction location for the pallet and, therefore, the search region extends the entire width of the distance map M. Thus, locations that the pallet template $T_P$ can be placed can be limited to those cells of the distance map M for which the pallet template $T_P$ will fit entirely within the search region 1602. In step 1508, the first time through the loop of this algorithm, the search region 1602 is defined and a starting location to place the pallet template $T_P$ within that search region 1602 is selected. In subsequent loops through the algorithm, a next, or subsequent, location to place the pallet template $T_P$ is determined, in step 1510. For example, the pallet template $T_P$ can be placed at the top left corner of the search region and then successively placed so that it travels down and to the right until the entire search region 1602 is searched.

In step 1512, the distance values are extracted from the cells of the map M that are aligned with template points of the pallet template $T_P$. As described above, with respect to FIGS. 12B and 13A-13D, the pallet template $T_P$ has a point that is considered the origin point of the template $T_P$ and the other template points are described by 2D coordinates relative to this origin point. So, if the template $T_P$ is overlaid at location M[a, b] and each of the 96 template points has 2D coordinate values that can be denoted by $T_R(m_i, n_i)$, then each the 96 cells of the distance map referenced by M[a+$m_i$, b+$n_i$] are aligned with the 96 template points.

These extracted distance values can be combined together in step 1514 in various manners to calculate a value of a cost function, or a "score" that indicates how well the location on the map M where the template $T_P$ is located matches the edges described by the template $T_P$. The root mean square of the distance values is one example score that can be calculated. In step 1516, a determination is made as to whether the current pallet matching score indicates a better match (i.e., is lower) than any previously calculated pallet matching score at a different position of this distance map M. If, so, then the present score becomes the new "best" pallet matching score and the location on the distance map M associated with this "best" pallet matching score is retained as well. Otherwise, the "best" pallet matching score remains unchanged.

In step 1518, a determination is made as to whether the search for an area of the distance map M that matches the pallet template $T_P$ is finished. As mentioned above, the criteria for ending a search can vary without departing from the scope of the present invention. There may be maximum number of map locations that can be tried. In one example, a determination is made whether a search region 1602 is defined and if the entire search region has been searched. In another example, if the template $T_P$ will fit on the distance map M at 40,000 locations, then the search could end once an arbitrary number (e.g., 20,000) of those locations have been tried. Alternatively, all 40,000 of those locations may be tried before ending the search. The search could also end if a "best" pallet matching score is found that exceeds a confidence level that a match has been found (e.g., of the threshold could be between about 1.25 to about 1.50 such that a matching score below that threshold would indicate the confidence level is exceeded).

If the search is not finished, then the algorithm loops back and performs one of steps 1510 and 1506 to make a determination as to the next location on the map M to overlay the pallet template $T_P$ so that the next "score" can be calculated for this new map location. If the search is finished, then the algorithm identifies, in step 1520, the "best" pallet matching score and its associated location (denoted M[$a_p$, $b_p$]) on the distance map M.

The best pallet matching score can be analyzed to determine if it has a value that indicates the camera 130 is positioned substantially as shown in FIG. 6. For example, a best pallet matching score above 1.75 likely indicates that nothing in the current image frame appears to match the applied template. If, however, the best pallet matching score is below 1.75, then additional steps can be performed utilizing the coordinate location associated with the best pallet matching score. The coordinate location M[$a_p$, $b_p$] is considered to be the location of a pallet object (or a rack in appropriate instances). Because the pallet object is larger in dimension than a single coordinate location, the coordinate location M[$a_p$, $b_p$] corresponds to some location on the pallet object having a physical structure similar to that of cell [0,0] of the pallet template.

By defining the pallet template $T_P$ as shown in FIG. 12B with its origin in the top left corner, constructing the distance map of FIG. 11D with its cells measured relative to the top left corner, and organizing the 3D point cloud in the same arrangement as the pixels are arranged in the image plane, the location M[$a_p$, $b_p$] can be directly mapped back to one of the points in the organized 3D point cloud. However, in many of the steps described above, the respective origin points for the various templates, point clouds, and distance maps could be defined differently such that the mapping between a particular distance map location and a point in the organized point cloud could still be accomplished by properly accounting for the various origin locations.

Because the camera 130 can be considered to be located at (0, 0) in the point cloud coordinates, the calculated ($X_C$, $Y_C$) coordinates of the pallet object are considered to be the location, in physical units of measurement, relative to the camera position. Of the ($X_C$, $Y_C$) coordinates of the pallet object, the $Y_C$ coordinate value can, for example, be compared to a current height of the forks of the vehicle 10 to determine if the forks are positioned at an appropriate height to be extended forward into the detected pallet. In making this determination, it is possible that the $Y_C$ coordinate of the pallet object does not correspond exactly to the height of a pallet hole but, instead, a pallet hole may actually be located 7 cm above, or below, that $Y_C$ coordinate of the object in the original point cloud coordinate system. This additional 7 cm value can be used when considering whether or not forks of the vehicle 10 vertically align with the physical pallet holes on the physical environment. In a similar manner, a vertical offset between the height of the forks and the location of the camera 130 can be taken into consideration as to whether or not the forks are at a desired height.

The other calculated coordinates $X_C$ and $Z_C$ could also be used to determine a position of the forks of the vehicle 10 relative to the camera 130 in the different axes. Thus, once a point (or multiple points) of the organized point cloud are determined to likely represent where openings of a pallet structure on a rack may be located, one or more of the coordinate components for these points may be analyzed to determine if they reveal the forks are positioned relative to the pallet structure at a desired location. If so, then the forks are located at a position where the forks of the truck can be automatically stopped. Thus, the imaging analysis computer 110 can instruct the vehicle computer 50 to stop the movement of the forks. The forks can then be moved forward either automatically or by the vehicle operator.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of analyzing an image comprising:
acquiring, by a computer, an image of a physical environment, wherein the image comprises a plurality of pixels, each pixel including a two-dimensional pixel location in a plane of the image and a depth value corresponding to a distance between a region of the physical environment and the plane of the image;
for each pixel, converting, by the computer, the two dimensional pixel location and the depth value into a corresponding three-dimensional point in the physical environment, wherein each respective three-dimensional point corresponding to a pixel is defined by three coordinate components (x, y, z), each of which has a value in physical units of measurement;
determining, by the computer, a set of edge points within the plurality of three-dimensional points based, at least in part, on the z coordinate component of one or more of the plurality of points;
generating, by the computer, a distance map, wherein the distance map comprises a matrix of cells;
identifying, by the computer, for each cell of the distance map, a closest one of the edge points;
assigning, by the computer, to each cell of the distance map, a respective distance value representing a distance between the cell and the closest one edge point to that cell; and
based on the respective distance values in the cells of the distance map, determining a location of at least one of a pallet or rack within the physical environment.

2. The method of claim 1, comprising:
locating, by the computer, a first template at a first plurality of different locations on the distance map, wherein at each of the first plurality of different locations, the first template is aligned with a first plurality of cells and has an origin associated with one of the cells; and
at each of the first plurality of different locations, calculating, by the computer, a first corresponding cost function value for the associated one cell.

3. The method of claim 2, wherein the first template is one of a rack template and a pallet template.

4. The method of claim 2, wherein the first template comprises a plurality of template points, each template point is defined by two coordinate components (m, n), each of which has a value in physical units of measurement.

5. The method of claim 4, wherein, for each template point of the first template, its corresponding coordinate component values m, n are each in the same physical units of measurement as the three coordinate components (x, y, z) of the three-dimensional points corresponding to the pixels of the image.

6. The method of claim 2, wherein each first corresponding cost function value is calculated based on a distance between each of the first plurality of cells and their respective closest one edge point.

7. The method of claim 6, wherein the first corresponding cost function is calculated by:
a) multiplying each of the respective distance values from the first plurality of cells with themselves to generate a plurality of squared values; and
b) determining a square root of a mean of the plurality of squared values.

8. The method of claim 6, comprising:
identifying, by the computer, each cell of the distance map having a first corresponding cost function value below a first predetermined threshold.

9. The method of claim 8, comprising:
locating, by the computer, a second template at a second plurality of different locations on the distance map, wherein at each of the second plurality of different locations, the second template is aligned with a second plurality of cells and has an origin associated with one of the cells; and
at each of the second plurality of different locations, calculating, by the computer, a second corresponding cost function value for the associated one cell.

10. The method of claim 9, comprising:
identifying, by the computer, each cell of the distance map having:
a first corresponding cost function value below the first predetermined threshold, and
a second corresponding cost function value below a second predetermined threshold.

11. The method of claim 9, wherein the first template is a rack template and the second template is a pallet template.

12. The method of claim 2, wherein the first template comprises data that identifies the associated first plurality of cells.

13. The method of claim 1, wherein the matrix of cells of the distance map comprise i columns of cells and j rows of cells defining (i×j) cells, with:
each column referenced by a first index value, a, between 1 and i;
each row referenced by a second index value, b, between 1 and j; and
each cell referenced by an index pair (a, b).

14. The method of claim 13, wherein, for each cell of the distance map, its corresponding index pair values a, b are each in the same physical units of measurement as the three coordinate components (x, y, z) of the three-dimensional points corresponding to the pixels of the image.

15. The method of claim 14, wherein the closest one edge point to the cell of the distance map is determined based on the respective (x, y) coordinate components of each of the edge points and the (a,b) index pair of that cell.

16. The method of claim 15, wherein the distance between the closest one edge point and the cell of the distance map is related to a Euclidian distance between the (x,y) coordinate components of the closest one edge point and the (a,b) index pair of that cell.

17. The method of claim 13, comprising:
identifying, by the computer, a maximum value of the x coordinate component from among all the edge points; and
identifying, by the computer, a maximum value of the y coordinate component from among all the edge points.

18. The method of claim 17, wherein:
i=the maximum value of the x coordinate component; and
j=the maximum value of the y coordinate component.

19. The method of claim 1, wherein determining the set of edge points comprises:
for each of the three-dimensional points:
comparing the z coordinate component of the three-dimensional point with the respective z coordinate component of each three-dimensional point in a predefined neighborhood of the three-dimensional points, to determine an associated edge value; and determining the three-dimensional point is in the set of edge points when its associated edge value is above a predetermined threshold.

20. The method of claim 1, wherein the respective distance value of each cell in the distance map is in the same physical units of measurement as the three coordinate components (x, y, z) of the points.

21. The method of claim 1, wherein the physical units of measurement is one of centimeters or millimeters.

22. A system for analyzing an image, the system comprising:
a memory device storing executable instructions; and
a processor in communication with the memory device, wherein the processor when executing the executable instructions:
acquires an image of a physical environment, wherein the image comprises a plurality of pixels, each pixel including a two-dimensional pixel location in a plane of the image and a depth value corresponding to a distance between a region of the physical environment and the plane of the image;
for each pixel, converts the two dimensional pixel location and the depth value into a corresponding three-dimensional point in the physical environment, wherein each respective three-dimensional point corresponding to a pixel is defined by three coordinate components (x, y, z), each of which has a value in physical units of measurement;
determines a set of edge points within the plurality of three-dimensional points based, at least in part, on the z coordinate component of one or more of the plurality of points;
generates a distance map, wherein the distance map comprises a matrix of cells;
identifies for each cell of the distance map, a closest one of the edge points;
assigns to each cell of the distance map, a respective distance value representing a distance between the cell and the closest one edge point to that cell; and
determines, based on the respective distance values in the cells of the distance map, a location of at least one of a pallet or rack within the physical environment.

23. The system of claim 22, wherein the processor when executing the executable instructions:
locates a first template at a first plurality of different locations on the distance map, wherein at each of the first plurality of different locations, the first template is aligned with a first plurality of cells and has an origin associated with one of the cells; and
at each of the first plurality of different locations, calculates a first corresponding cost function value for the associated one cell.

24. The system of claim 23, wherein the first template is one of a rack template and a pallet template.

25. The system of claim 23, wherein the first template comprises a plurality of template points, each template point is defined by two coordinate components (m, n), each of which has a value in physical units of measurement.

26. The system of claim 25, wherein, for each template point of the first template, its corresponding coordinate component values m, n are each in the same physical units of measurement as the three coordinate components (x, y, z) of the three-dimensional points corresponding to the pixels of the image.

27. The system of claim 23, wherein each first corresponding cost function value is calculated based on a distance between each of the first plurality of cells and their respective closest one edge point.

28. The system of claim 27, wherein the first corresponding cost function is calculated by:
a) multiplying each of the respective distance values from the first plurality of cells with themselves to generate a plurality of squared values; and
b) determining a square root of a mean of the plurality of squared values.

29. The system of claim 27, wherein the processor when executing the executable instructions:
identifies each cell of the distance map having a first corresponding cost function value below a first predetermined threshold.

30. The system of claim 29, wherein the processor when executing the executable instructions:
locates a second template at a second plurality of different locations on the distance map, wherein at each of the second plurality of different locations, the second template is aligned with a second plurality of cells and has an origin associated with one of the cells; and
at each of the second plurality of different locations, calculates a second corresponding cost function value for the associated one cell.

31. The system of claim 30, wherein the processor when executing the executable instructions:
identifies each cell of the distance map having:
a first corresponding cost function value below the first predetermined threshold, and
a second corresponding cost function value below a second predetermined threshold.

32. The system of claim 30, wherein the first template is a rack template and the second template is a pallet template.

33. The system of claim 23, wherein the first template comprises data that identifies the associated first plurality of cells.

34. The system of claim 22, wherein the matrix of cells of the distance map comprise i columns of cells and j rows of cells defining (i×j) cells, with:
each column referenced by a first index value, a, between 1 and i;
each row referenced by a second index value, b, between 1 and j; and
each cell referenced by an index pair (a, b).

35. The system of claim 34, wherein, for each cell of the distance map, its corresponding index pair values a, b are each in the same physical units of measurement as the three coordinate components (x, y, z) of the three-dimensional points corresponding to the pixels of the image.

36. The system of claim 35, wherein the closest one edge point to the cell of the distance map is determined based on the respective (x, y) coordinate components of each of the edge points and the (a,b) index pair of that cell.

37. The system of claim 36, wherein the distance between the closest one edge point and the cell of the distance map is related to a Euclidian distance between the (x,y) coordinate components of the closest one edge point and the (a,b) index pair of that cell.

38. The system of claim 34, wherein the processor when executing the executable instructions:
identifies a maximum value of the x coordinate component from among all the edge points; and
identifies a maximum value of the y coordinate component from among all the edge points.

39. The system of claim 38, wherein:
i=the maximum value of the x coordinate component; and
j=the maximum value of the y coordinate component.

40. The system of claim 22, wherein the processor when determining the set of edge points:
for each of the three-dimensional points:
compares the z coordinate component of the three-dimensional point with the respective z coordinate component of each three-dimensional point in a predefined neighborhood of the three-dimensional points, to determine an associated edge value; and
determines the three-dimensional point is in the set of edge points when its associated edge value is above a predetermined threshold.

41. The system of claim 22, wherein the respective distance value of each cell in the distance map is in the same physical units of measurement as the three coordinate components (x, y, z) of the points.

42. The system of claim 22, wherein the physical units of measurement is one of centimeters or millimeters.

* * * * *

UNITED STATES PATENT AND TRADEMARK OFFICE
CERTIFICATE OF CORRECTION

PATENT NO. : 9,990,535 B2
APPLICATION NO. : 15/139394
DATED : June 5, 2018
INVENTOR(S) : Sian Phillips et al.

Page 1 of 2

It is certified that error appears in the above-identified patent and that said Letters Patent is hereby corrected as shown below:

In the Specification

In the Description:

Column 4, Line 33, "ponents (x, y, z) of the of the three-dimensional points" should read --ponents (x, y, z) of the three-dimensional points--

Column 10, Line 26, "An image plane is located a distance, f from the" should read --An image plane is located a distance, f, from the--

Column 11, Line 44, " $d = X_C^2 + Y_C^2 + Z_C^2$ " should read -- $d^2 = X_C^2 + Y_C^2 + Z_C^2$ --

Column 11, Lines 63-65, " $X_C^2 = d^2 \left( \frac{z_C^2 * \left(\frac{u}{f_x}\right)^2}{z_C^2 * \left(\frac{u}{f_x}\right)^2 + z_C^2 * \left(\frac{v}{f_x}\right)^2 + z_C^2} \right)$ " should read -- $X_C^2 = d^2 \left( \frac{z_C^2 * \left(\frac{u}{f_x}\right)^2}{z_C^2 * \left(\frac{u}{f_x}\right)^2 + z_C^2 * \left(\frac{v}{f_y}\right)^2 + z_C^2} \right)$ --

Column 12, Line 54, "the above equations to find set of 3D coordinates" should read --the above equations to find a set of 3D coordinates--

Column 15, Line 39, "estimate a Euclidian distance, examples one that may be" should read --estimate a Euclidian distance, examples of one that may be--

Column 19, Line 58, "fit on the distance map Mat 40,000 locations" should read --fit on the distance map M at 40,000 locations--

Signed and Sealed this
Twenty-ninth Day of January, 2019

Andrei Iancu
*Director of the United States Patent and Trademark Office*

CERTIFICATE OF CORRECTION (continued)
U.S. Pat. No. 9,990,535 B2

Column 21, Line 13, "each the 96 cells of the distance map" should read --each of the 96 cells of the distance map--

Column 21, Line 34, "the scope of the present invention. There may be maximum" should read --the scope of the present invention. There may be a maximum--

Column 21, Line 39, "map Mat 40,000 locations, then the search" should read --map M at 40,000 locations, then the search--